US012587590B2

(12) United States Patent
Yanagi

(10) Patent No.: US 12,587,590 B2
(45) Date of Patent: Mar. 24, 2026

(54) INFORMATION-PROCESSING APPARATUS FOR MANAGING SESSION DISCONNECTION AND RECONNECTION, INFORMATION-PROCESSING METHOD FOR MANAGING SESSION DISCONNECTION AND RECONNECTION, AND PROGRAM

(71) Applicants: DAIKIN INDUSTRIES, LTD., Osaka (JP); Fairy Devices Inc., Tokyo (JP)

(72) Inventor: Kotaro Yanagi, Osaka (JP)

(73) Assignees: DAIKIN INDUSTRIES, LTD., Osaka (JP); Fairy Devices Inc., Tokyo (JP)

( * ) Notice: Subject to any disclaimer, the term of this patent is extended or adjusted under 35 U.S.C. 154(b) by 0 days.

(21) Appl. No.: 18/845,608

(22) PCT Filed: Mar. 9, 2023

(86) PCT No.: PCT/JP2023/009022
§ 371 (c)(1),
(2) Date: Sep. 10, 2024

(87) PCT Pub. No.: WO2023/176678
PCT Pub. Date: Sep. 21, 2023

(65) Prior Publication Data
US 2025/0112975 A1      Apr. 3, 2025

(30) Foreign Application Priority Data
Mar. 17, 2022    (JP) ................................. 2022-042156

(51) Int. Cl.
H04L 67/145      (2022.01)
H04L 65/1094     (2022.01)
H04W 76/19       (2018.01)

(52) U.S. Cl.
CPC ........ *H04L 67/145* (2013.01); *H04L 65/1094* (2022.05); *H04W 76/19* (2018.02)

(58) Field of Classification Search
None
See application file for complete search history.

(56) References Cited

U.S. PATENT DOCUMENTS 8,213,915 B1      7/2012   Upadhyay et al.
2003/0236905 A1   12/2003  Choi et al.
(Continued)

FOREIGN PATENT DOCUMENTS

JP      2010-224842      10/2010
JP      2018-185570      11/2018
(Continued)

OTHER PUBLICATIONS

International Search Report for PCT/JP2023/009022 mailed on May 23, 2023.
(Continued)

*Primary Examiner* — Joshua Joo
(74) *Attorney, Agent, or Firm* — IPUSA, PLLC

(57) ABSTRACT

A server apparatus, a management program, and a management system for reducing the operation load of a site worker when resuming bidirectional communication, are provided. A server apparatus is configured to manage a session when bidirectional communication is performed by a first terminal and a second terminal, the server apparatus including a control unit configured to reconnect the first terminal to the session to which the first terminal had been connected, when a connection request specifying an identifier of the session to which the first terminal had been connected is transmitted from the first terminal, and when the session to which the first terminal had been connected is maintained.

11 Claims, 17 Drawing Sheets

(56) References Cited

U.S. PATENT DOCUMENTS

| | | | | |
|---|---|---|---|---|
| 2007/0087769 | A1* | 4/2007 | Takahashi | H04W 4/029 |
| | | | | 455/518 |
| 2010/0064130 | A1* | 3/2010 | Borisov | H04L 67/142 |
| | | | | 713/151 |
| 2012/0066326 | A1* | 3/2012 | Soderstrom | H04M 3/563 |
| | | | | 709/206 |
| 2012/0158814 | A1 | 6/2012 | Sabiwalsky | |
| 2014/0185608 | A1* | 7/2014 | Efrati | H04L 65/80 |
| | | | | 370/352 |
| 2014/0194097 | A1* | 7/2014 | Gaddam | H04W 12/06 |
| | | | | 455/411 |
| 2015/0078543 | A1* | 3/2015 | Gisby | H04M 3/38 |
| | | | | 379/202.01 |
| 2016/0099984 | A1* | 4/2016 | Karagiannis | H04L 67/146 |
| | | | | 709/204 |
| 2016/0247124 | A1* | 8/2016 | Holst | H04L 65/1096 |
| 2017/0034223 | A1 | 2/2017 | Arscott et al. | |
| 2017/0111405 | A1 | 4/2017 | Kato | |
| 2017/0339741 | A1* | 11/2017 | K | H04L 67/52 |
| 2018/0013856 | A1* | 1/2018 | Neerincx | H04L 67/142 |
| 2018/0063258 | A1* | 3/2018 | Wang | H04L 65/613 |
| 2018/0309814 | A1* | 10/2018 | Coulombe | H04L 67/142 |
| 2019/0238536 | A1* | 8/2019 | Chilla | H04L 63/0823 |
| 2019/0245898 | A1* | 8/2019 | Rosenberg | H04L 67/146 |
| 2020/0359178 | A1* | 11/2020 | Mazzarella | H04L 65/1069 |
| 2022/0103641 | A1* | 3/2022 | Hassler | H04L 67/568 |
| 2022/0368548 | A1* | 11/2022 | Chang | G06F 3/04886 |
| 2023/0208897 | A1* | 6/2023 | Wiklund | H04L 65/1069 |
| | | | | 709/224 |

FOREIGN PATENT DOCUMENTS

| | | |
|---|---|---|
| JP | 2020-149432 | 9/2020 |
| WO | 2016/013530 | 1/2016 |

OTHER PUBLICATIONS

International Preliminary Report on Patentability for PCT/JP2023/009022 mailed on Sep. 26, 2024.

Extended European search report mailed on May 26, 2025 with respect to the corresponding European patent application No. 23770634.6.

* cited by examiner (a)

Figure 5:
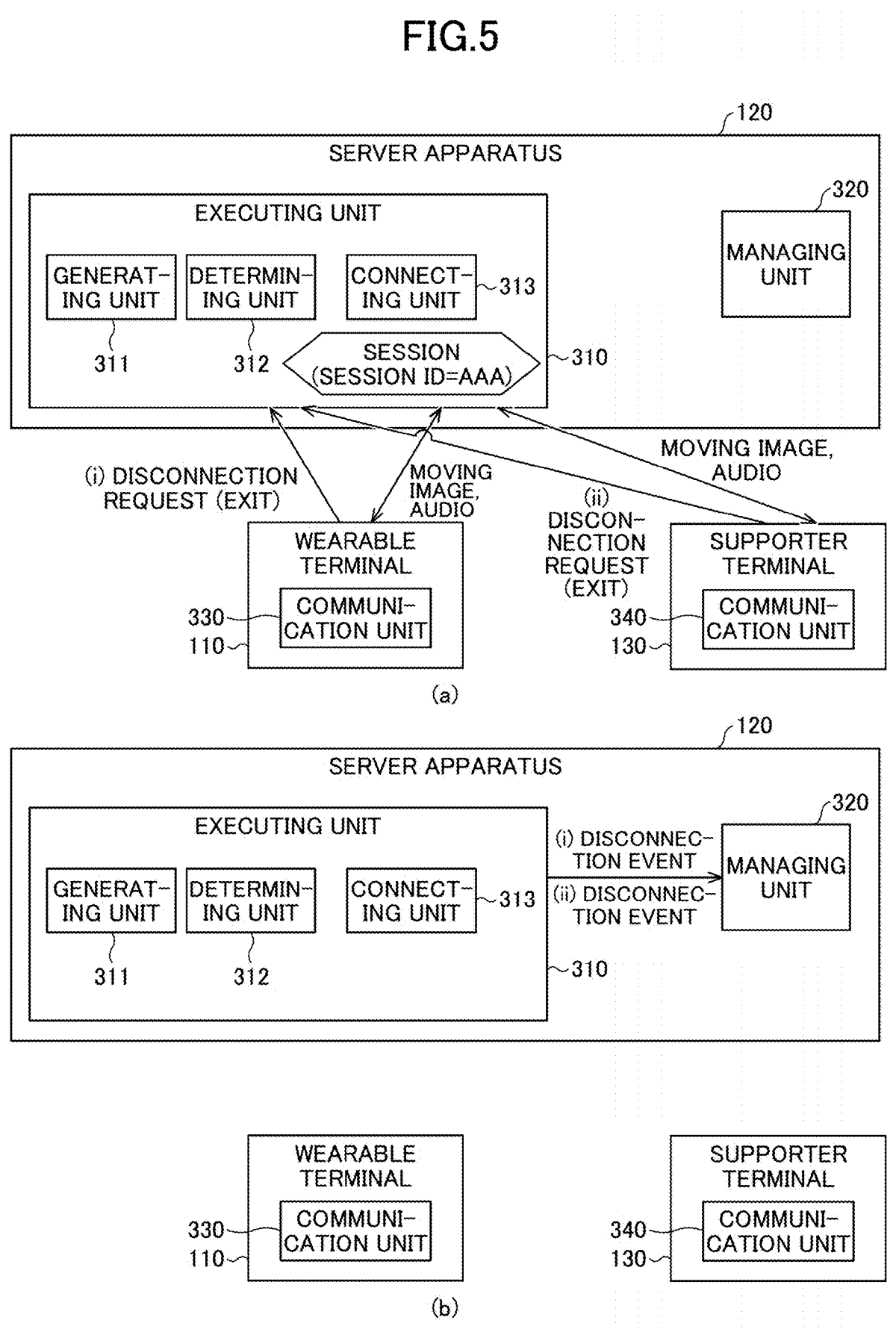

┌─────────────────────────────────────────────────────────────────┐ 120
│ SERVER APPARATUS                                                  │
│                                                                   │
│  ┌──────────────────────────────────────────────┐   ┌─────────┐ │ 320
│  │ EXECUTING UNIT                                 │   │MANAGING │ │
│  │                                                │   │ UNIT    │ │
│  │ ┌────────┐ ┌────────┐  ┌────────┐              │   └─────────┘ │
│  │ │GENERAT-│ │DETERMIN│  │CONNECT-│ ~313         │               │
│  │ │ING UNIT│ │ING UNIT│  │ING UNIT│              │               │
│  │ └────────┘ └────────┘  └────────┘              │               │
│  │    311        312   ╱─────────────╲ ~310       │               │
│  │                     │  SESSION      │          │               │
│  │                     │(SESSION ID=AAA)│         │               │
│  │                     ╲─────────────╱            │               │
│  └──────────────────────────────────────────────┘               │
└─────────────────────────────────────────────────────────────────┘

(i) DISCONNECTION    MOVING      MOVING IMAGE,
REQUEST (EXIT)      IMAGE,     AUDIO
             AUDIO
                    (ii)
                    DISCON-
                    NECTION
                    REQUEST
                    (EXIT)

┌──────────────────┐                    ┌──────────────────┐
│ WEARABLE         │                    │ SUPPORTER        │
│ TERMINAL         │                    │ TERMINAL         │
│ ┌──────────────┐ │                    │ ┌──────────────┐ │
│ │ COMMUNI-     │ │                    │ │ COMMUNI-     │ │
│ │ CATION UNIT  │ │                    │ │ CATION UNIT  │ │
│ └──────────────┘ │                    │ └──────────────┘ │
└──────────────────┘                    └──────────────────┘
330~ 110~                               340~ 130~

(a)

┌─────────────────────────────────────────────────────────────────┐ 120
│ SERVER APPARATUS                                                  │
│                                                                   │
│  ┌──────────────────────────────────────────────┐               │
│  │ EXECUTING UNIT                                 │ (i) DISCONNEC- ┌─────────┐ 320
│  │                                                │ TION EVENT    │MANAGING │
│  │ ┌────────┐ ┌────────┐  ┌────────┐              │───────────────►│ UNIT    │
│  │ │GENERAT-│ │DETERMIN│  │CONNECT-│ ~313         │ (ii) DISCONNEC-│         │
│  │ │ING UNIT│ │ING UNIT│  │ING UNIT│              │ TION EVENT    └─────────┘
│  │ └────────┘ └────────┘  └────────┘              │               │
│  │    311        312                   ~310       │               │
│  └──────────────────────────────────────────────┘               │
└─────────────────────────────────────────────────────────────────┘

┌──────────────────┐                    ┌──────────────────┐
│ WEARABLE         │                    │ SUPPORTER        │
│ TERMINAL         │                    │ TERMINAL         │
│ ┌──────────────┐ │                    │ ┌──────────────┐ │
│ │ COMMUNI-     │ │                    │ │ COMMUNI-     │ │
│ │ CATION UNIT  │ │                    │ │ CATION UNIT  │ │
│ └──────────────┘ │                    │ └──────────────┘ │
└──────────────────┘                    └──────────────────┘
330~ 110~                               340~ 130~

INFORMATION-PROCESSING APPARATUS FOR MANAGING SESSION DISCONNECTION AND RECONNECTION, INFORMATION-PROCESSING METHOD FOR MANAGING SESSION DISCONNECTION AND RECONNECTION, AND PROGRAM

TECHNICAL FIELD

The present disclosure relates to a server apparatus, a management program, and a management system.

BACKGROUND ART

There is known a management system that enables support for a site worker by a support person who is remote, in which when the site worker wearing a wearable terminal performs various kinds of work, the wearable terminal is connected to the terminal of the support person who is remote, and bidirectional communication is performed with the terminal of the support person.

According to the management system, a site worker can receive instructions from a support person in real time, and can smoothly perform various kinds of work even if the site worker has only a few years of experience.

CITATION LIST

Patent Document

[Patent document 1] WO 2016/013530

SUMMARY OF INVENTION

Technical Problem

Here, the site where the site worker performs various kinds of work is generally in an environment where radio waves tend to get disrupted. Therefore, the bidirectional communication is frequently cut off, necessitating the site worker to connect the wearable terminal to a new session each time and perform an operation to resume the bidirectional communication.

On the other hand, a wearable terminal is not provided with a user interface (for example, an operation screen) suitable for a complicated operation, and the operation for resuming bidirectional communication is a heavy operation load for a site worker.

The present disclosure provides a server apparatus, a management program, and a management system for reducing the operation load for a site worker when resuming bidirectional communication.

Solution to Problem

A first aspect of the present disclosure is
a server apparatus configured to manage a session when bidirectional communication is performed by a first terminal and a second terminal, the server apparatus including:
a control unit configured to reconnect the first terminal to the session to which the first terminal had been connected, when a connection request specifying an identifier of the session to which the first terminal had been connected is transmitted from the first terminal, and when the session to which the first terminal had been connected is maintained.

According to a first aspect of the present disclosure, it is possible to provide a server apparatus which reduces the operation load of a site worker when resuming bidirectional communication.

A second aspect of the present disclosure is the server apparatus according to the first aspect, wherein the control unit determines whether the session having the identifier specified in the connection request is maintained when the connection request specifying the identifier of the session to which the first terminal had been connected is transmitted from the first terminal after the bidirectional connection by the first terminal is disconnected, and reconnects the first terminal to the session having the identifier specified in the connection request upon determining that the session is maintained, to resume the bidirectional communication with the second terminal already connected to the corresponding session.

A third aspect of the present disclosure is the server apparatus according to the second aspect, wherein the control unit newly generates a session having the identifier specified in the connection request upon determining that the session is not maintained, and connects the first terminal to the newly generated session and connects the second terminal to the newly generated session according to a connection request from the second terminal, to resume the bidirectional communication by the first terminal and the second terminal.

A fourth aspect of the present disclosure is a server apparatus according to any of the first to third aspects, wherein the control unit deletes a session for which a number of connected terminals has become zero, and maintains a session for which a number of connected terminals is one or more.

A fifth aspect of the present disclosure is a server apparatus according to any of the second to fourth aspects, wherein the control unit transmits, to the first terminal, a reconnection request including the identifier of the session to which the first terminal had been connected, when the session to which the first terminal had been connected is maintained even after the bidirectional communication by the first terminal is disconnected, and reconnects the first terminal to the session having the identifier specified in the connection request when the connection request specifying the same identifier as the identifier included in the reconnection request is transmitted from the first terminal in response to transmitting the reconnection request, to resume the bidirectional communication with the second terminal already connected to the corresponding session.

A sixth aspect of the present disclosure is the server apparatus according to any of the second to fifth aspects, wherein the first terminal is used in an environment in which a frequency that the bidirectional communication is disconnected is higher than that of the second terminal.

A seventh aspect of the present disclosure is the server apparatus according to the sixth aspect, wherein the first terminal is worn by a site worker, and the second terminal is used by a supporter who supports the site worker.

An eighth aspect of the present disclosure is a management program that causes a control unit of a server apparatus configured to manage a session when bidirectional communication is performed by a first terminal and a second terminal, to execute a process of reconnecting the first terminal to the session to which the first terminal had been connected, when a connection request specifying an identifier of the session to which the first terminal had been connected is transmitted from the first terminal, and when the session to which the first terminal had been connected is maintained.

According to an eighth aspect of the present disclosure, it is possible to provide a management program for reducing an operation load on a site worker when bidirectional communication is resumed.

A ninth aspect of the present disclosure is a management system including:

a first terminal;

a second terminal; and a server apparatus configured to manage a session when bidirectional communication is performed by the first terminal and the second terminal, wherein the server apparatus includes a control unit configured to reconnect the first terminal to the session to which the first terminal had been connected, when a connection request specifying an identifier of the session to which the first terminal had been connected is transmitted from the first terminal, and when the session to which the first terminal had been connected is maintained.

According to an ninth aspect of the present disclosure, it is possible to provide a management system for reducing an operation load on a site worker when resuming bidirectional communication.

A tenth aspect of the present disclosure is a management system according to a ninth aspect, wherein the second terminal includes a control unit configured to select either one of a first session or a second session when the first session and the second session are maintained, and transmit, to the server apparatus, a connection request specifying an identifier of the selected session.

An eleventh aspect of the present disclosure is a management system according to the ninth or tenth aspect, wherein the control unit of the server apparatus transmits, to the first terminal, a reconnection request including the identifier of the session to which the first terminal had been connected, when the session to which the first terminal had been connected is maintained even after the bidirectional communication by the first terminal is disconnected, and the first terminal includes a control unit configured to store the specified identifier of the session when starting the bidirectional communication with the second terminal, determine whether the stored identifier is the same as the identifier included in the reconnection request, and transmit, to the server apparatus, the connection request specifying the stored identifier upon determining that the stored identifier is the same as the identifier included in the reconnection request.

BRIEF DESCRIPTION OF DRAWINGS

FIG. 5 is a diagram for explaining details of processing of each unit at the time of bidirectional communication disconnection and after bidirectional communication is ended.

FIG. 7 is a second sequence diagram illustrating the flow of processing in the management system.

DESCRIPTION OF EMBODIMENTS

Figure 1:
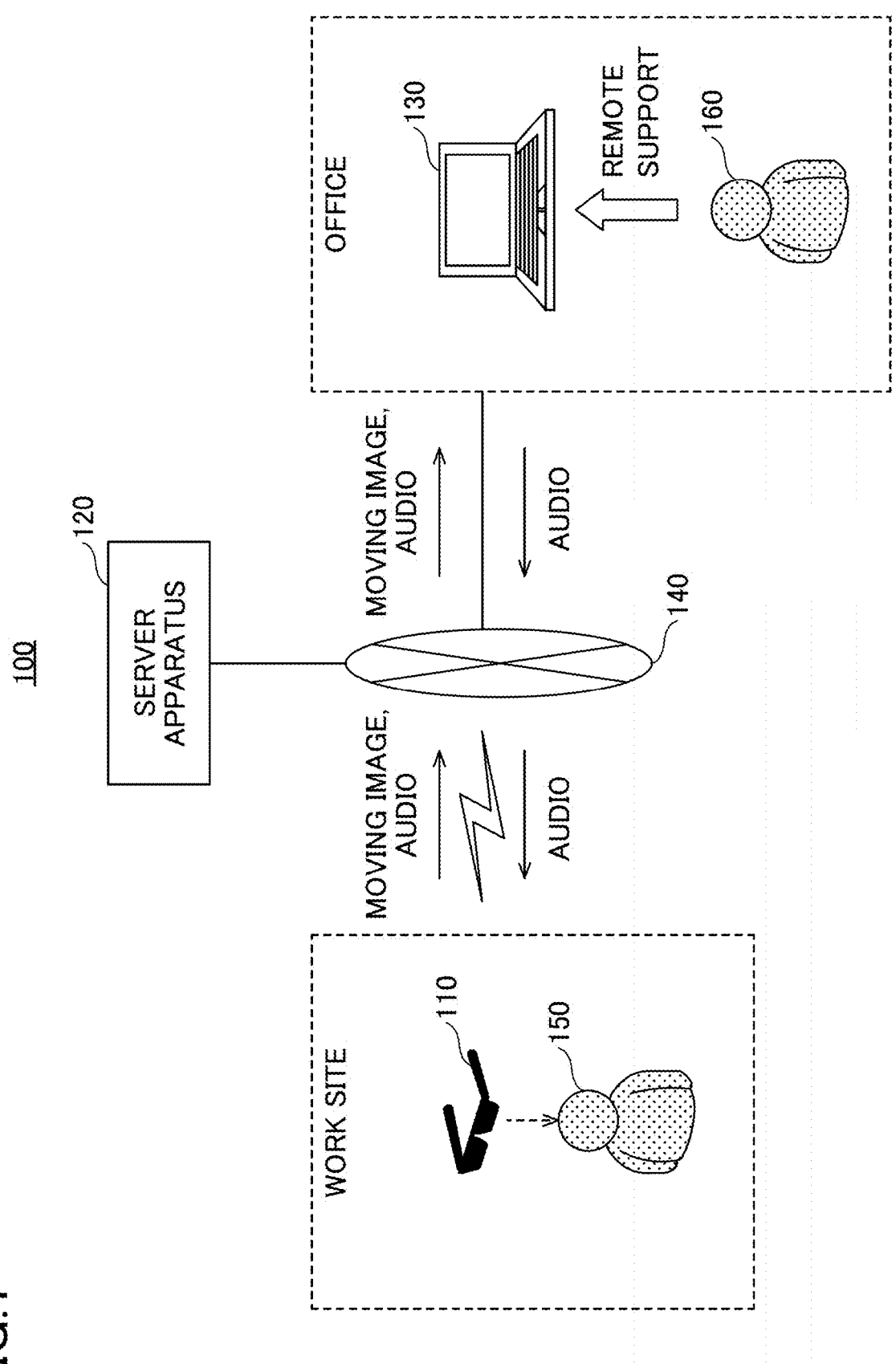
FIG. 1 is a diagram illustrating an example of a system configuration of a management system.

Each embodiment will be described below with reference to the accompanying drawings. In the present specification and the drawings, elements having substantially the same functional configuration are denoted by the same reference numerals, thereby omitting redundant explanations.

First Embodiment

<System Configuration of Management System>

First, a system configuration of a management system according to a first embodiment will be described. FIG. 1 is a diagram illustrating an example of a system configuration of a management system. As illustrated in FIG. 1, a management system 100 includes a wearable terminal 110, a server apparatus 120, and a supporter terminal 130. In the management system 100, the wearable terminal 110 and the supporter terminal 130 are communicatively connected to the server apparatus 120 via a network 140, and can receive cloud services from the server apparatus 120. Specifically, the wearable terminal 110 and the supporter terminal 130 can perform bidirectional communication under management by the server apparatus 120.

The wearable terminal 110 is an example of a first terminal, and is a terminal worn by a site worker 150 at a work site. In the present embodiment, it is assumed that the work site is an environment where bidirectional communication is frequently cut off.

As illustrated in FIG. 1, the wearable terminal 110 has a shape to be worn on the head of the site worker 150, for example, and has a function of capturing a moving image, a function of detecting a voice (for example, the utterance of the site worker 150), and the like.

Further, as illustrated in FIG. 1, the wearable terminal 110 has a function of transmitting video data in which the state of the work site is captured and audio data in which the speech of the site worker 150 is detected to a supporter 160 via the network 140. Thus, the supporter 160 can acquire data necessary for giving instructions to the site worker 150.

Further, as illustrated in FIG. 1, the wearable terminal 110 has a function of receiving instructions from the supporter 160 as audio data via the network 140 and outputting the audio data to the site worker 150. Thus, the site worker 150 can perform various kinds of work while receiving appropriate instructions from the supporter 160.

The server apparatus 120 is an apparatus that provides cloud services via the network 140 and manages a session when the wearable terminal 110 and the supporter terminal 130 perform bidirectional communication. The server apparatus 120 maintains a session even when the bidirectional communication is disconnected in one of the terminals (i.e. either the wearable terminal 110 or the supporter terminal 130) provided that the bidirectional communication is connected in the other one of the terminals. Therefore, for example, even when the bidirectional communication is disconnected in the wearable terminal 110 used in a work site where the frequency of disconnection is high, the wearable terminal 110 can automatically reconnect to the same session, eliminating the need for a new operation by the site worker.

Accordingly, according to the server apparatus 120, the operation load when the site worker 150 resumes the bidirectional communication can be reduced.

Further, while the wearable terminal 110 is connected to the session and the supporter terminal 130 is connected to the session, the server apparatus 120 transmits the moving image data and the audio data received from the wearable terminal 110 to the supporter terminal 130.

Similarly, while the wearable terminal 110 is connected to the session and the supporter terminal 130 is connected to the session, the server apparatus 120 transmits the audio data received from the supporter terminal 130 to the wearable terminal 110.

The supporter terminal 130 is an example of the second terminal, and is installed, for example, in an office where the supporter 160 always resides while on duty, receives an instruction from the supporter 160, and transmits the instruction to the site worker 150 via the network 140. Further, the supporter terminal 130 acquires the moving image data captured by the wearable terminal 110 and the audio data detected by the wearable terminal 110 via the network 140, and outputs the acquired data to the supporter 160.

<Hardware Configuration of Wearable Terminal and Server Apparatus>

Figure 2:
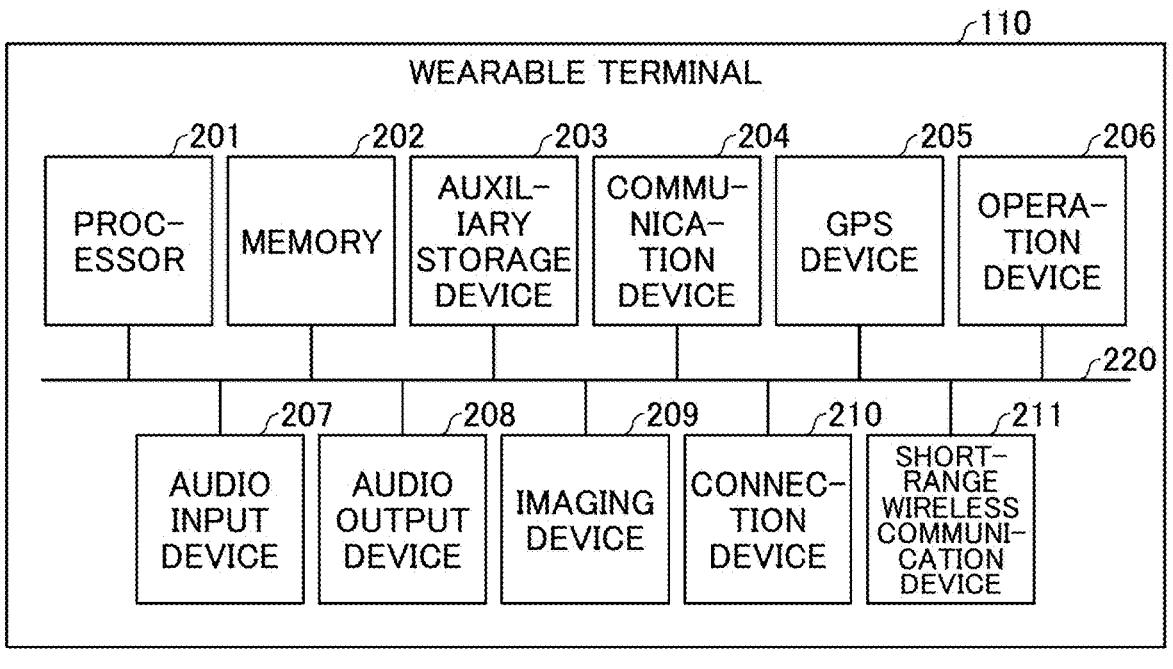
FIG. 2 is a diagram illustrating an example of a hardware configuration of a wearable terminal and a server apparatus.

Next, the hardware configuration of the wearable terminal 110 and the server apparatus 120 will be described with reference to FIG. 2. FIG. 2 is a diagram illustrating an example of the hardware configuration of the wearable terminal and the server apparatus.

(1) Hardware Configuration of the Wearable Terminal

First, the hardware configuration of the wearable terminal 110 will be described. FIG. 2 (a) is a diagram illustrating an example of the hardware configuration of the wearable terminal 110.

As illustrated in FIG. 2 (a), the wearable terminal 110 includes a processor 201, a memory 202, an auxiliary storage device 203, a communication device 204, a GPS (Global Positioning System) device 205, and an operation device 206. The wearable terminal 110 also includes an audio input device 207, an audio output device 208, an imaging device 209, a connection device 210, and a short-range wireless communication device 211. The respective hardware elements of the wearable terminal 110 are connected to each other via a bus 220.

The processor 201 has various computing devices such as a CPU (Central Processing Unit). The processor 201 loads various programs (for example, a bidirectional communication program described later) into the memory 202 and executes the programs. The memory 202 has main storage devices such as a ROM (Read Only Memory) and a RAM (Random Access Memory). The processor 201 and the memory 202 form a so-called computer (also referred to as a "control unit"), and when the processor 201 executes various programs loaded into the memory 202, the computer implements various functions.

The auxiliary storage device 203 stores various programs and various kinds of information used when the various programs are executed by the processor 201.

The communication device 204 is a communication device for transmitting and receiving various kinds of data (for example, moving image data and audio data) to and from the server apparatus 120. The GPS device 205 detects positional information of the wearable terminal 110.

The operation device 206 receives a simple operation with respect to the wearable terminal 110 by the site worker 150 such as a power ON/OFF switch of the wearable terminal 110.

The audio input device 207 detects the voice of the site worker 150 wearing the wearable terminal 110 and audio data such as ambient sounds in the site.

The audio output device 208 is, for example, a device for outputting audio of various kinds of data received from the server apparatus 120 to the site worker 150 wearing the wearable terminal 110.

The imaging device 209 captures the surroundings of the site worker 150 wearing the wearable terminal 110 and generates moving image data.

The connection device 210 is a connection device for connecting various attached sensors to the wearable terminal 110.

The short-range wireless communication device 211 is a wireless device for performing short-range wireless communication with a wearable terminal worn by another site worker, who exists around the site worker 150 wearing the wearable terminal 110.

(2) Hardware Configuration of the Server Apparatus 120

Next, the hardware configuration of the server apparatus 120 will be described. FIG. 2 (b) is a diagram illustrating an example of the hardware configuration of the server apparatus 120. As illustrated in FIG. 2 (b), the server apparatus 120 includes a processor 231, a memory 232, an auxiliary storage device 233, an operation device 234, a display device 235, a communication device 236, and a drive device 237. The hardware of the server apparatus 120 is connected to each other via a bus 238.

The processor 231 has various computing devices such as a CPU (Central Processing Unit). The processor 231 loads various programs (for example, a management program described later) into the memory 232 and executes the programs.

The memory 232 has main storage devices such as a ROM (Read Only Memory) and a RAM (Random Access Memory). The processor 231 and the memory 232 form what is referred to as a computer (also referred to as a "control unit"), and the processor 231 executes various programs loaded into the memory 232, whereby the computer implements various functions.

The auxiliary storage device 233 stores various programs and various kinds of data used when the various programs are executed by the processor 231.

The operation device 234 is an operation device for the administrator of the server apparatus 120 to perform various operations. The display device 235 is a display device for displaying the results of various processes executed by the server apparatus 120.

The communication device 236 is a communication device for communicating with an external device (for example, the wearable terminal 110, the supporter terminal 130) via the network 140.

The drive device 237 is a device for setting the recording medium 240. The recording medium 240 includes a medium for recording information optically, electrically, or magnetically, such as a CD-ROM, a flexible disk, a magneto-optical disk, and the like. The recording medium 240 may also include a semiconductor memory for electrically recording information, such as a ROM, a flash memory, and the like.

The various programs installed in the auxiliary storage device 233 are installed, for example, when the distributed recording medium 240 is set in the drive device 237 and the various programs recorded in the recording medium 240 are read out by the drive device 237. Alternatively, the various programs installed in the auxiliary storage device 233 may be installed by being downloaded from the network 140 via the communication device 236.

Although the hardware configuration of the supporter terminal 130 has not been mentioned here, it is assumed that the hardware configuration of the supporter terminal 130 is generally the same as that of the server apparatus 120. However, in the case of the supporter terminal 130, it is assumed that a program similar to the bidirectional communication program installed in the wearable terminal 110 is installed in the auxiliary storage device.

<Functional Configuration of Server Apparatus, Wearable Terminal, and Supporter Terminal>

Next, the functional configurations of the server apparatus 120, the wearable terminal 110, and the supporter terminal 130 will be described. As described above, a management program is installed in the server apparatus 120, and when the program is executed, the server apparatus 120 functions as an executing unit 310 and a managing unit 320. Further, the executing unit 310 of the server apparatus 120 functions as the generating unit 311, the determining unit 312, and the connecting unit 313.

As described above, a bidirectional communication program is installed in the wearable terminal 110 and the supporter terminal 130, respectively. When the program is executed, the wearable terminal 110 functions as the communication unit 330, and the supporter terminal 130 functions as the communication unit 340.

Hereinafter, the details of the processing of each unit of the server apparatus 120, the wearable terminal 110, and the supporter terminal 130 will be described separately for each phase of the bidirectional communication.

(1) Before and After Bidirectional Communication

Figure 3:
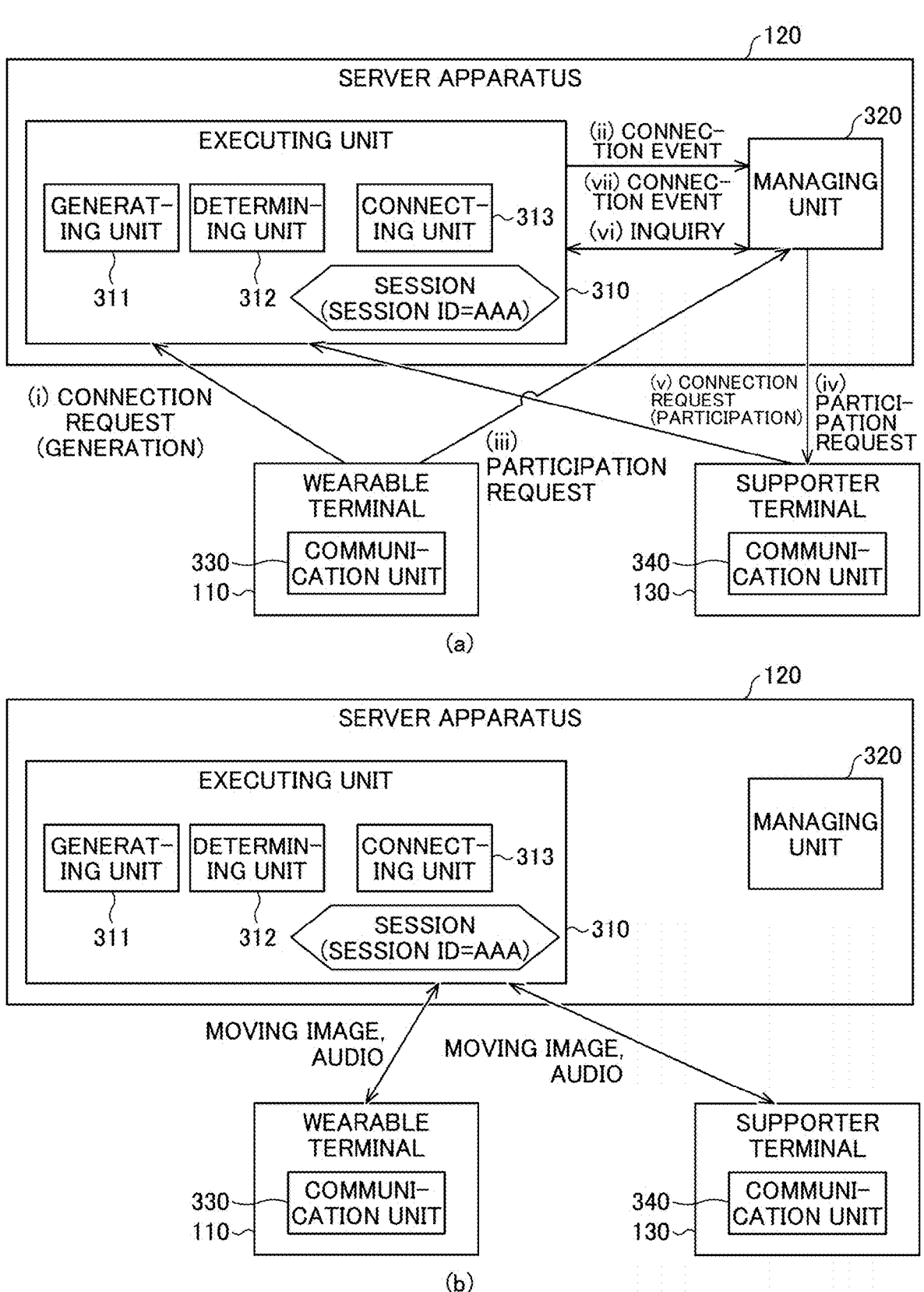
FIG. 3 is a first diagram for explaining details of processing of each unit before and after bidirectional communication is started.

First, the details of the processing of each unit of the server apparatus 120, the wearable terminal 110, and the supporter terminal 130 before and after the bidirectional communication is started will be described. FIG. 3 is a diagram for explaining the details of the processing of each unit before and after the bidirectional communication is started.

FIG. 3 (a) is a diagram illustrating the details of the processing of each unit before the bidirectional communication. As illustrated in FIG. 3 (a), before the bidirectional communication, the generating unit 311 of the server apparatus 120 receives a request (connection request (generation)) from the from the communication unit 330 of the wearable terminal 110 requesting to generate a new session having a specified identifier (session ID); and
   connect the wearable terminal 110 to the new session to
      be generated.

Upon receiving the connection request (generation) from the communication unit 330 of the wearable terminal 110, the generating unit 311 of the server apparatus 120 generates a new session having a specified session ID (for example, session ID=AAA). The connecting unit 313 of the server apparatus 120 connects the wearable terminal 110 to the generated new session and notifies the managing unit 320 of the connection event. Accordingly, the managing unit 320 of the server apparatus 120 starts management of the new session having the session ID=AAA.

When the communication unit 330 of the wearable terminal 110 is connected to the new session having the session ID=AAA, the communication unit 330 transmits a participation request including the session ID=AAA to the server apparatus 120.

When the managing unit 320 of the server apparatus 120 receives the participation request from the communication unit 330 of the wearable terminal 110 after the connection event is notified from the connecting unit 313 of the server apparatus 120, the managing unit 320 transmits the received participation request to the communication unit 340 of the supporter terminal 130.

Upon receiving the participation request, the communication unit 340 of the supporter terminal 130 sends a request (connection request (participation)) to the server apparatus 120, requesting to participate in an existing session having the specified
      session ID; and
   connect the supporter terminal 130 to the existing session.

Upon receiving the connection request (participation) from the communication unit 340 of the supporter terminal 130, the determining unit 312 of the server apparatus 120 determines whether a session having the specified session ID (for example, session ID=AAA) has already been generated and is maintained. The determination by the determining unit 312 is performed based on the result of an inquiry to the managing unit 320 that manages the session. If the determining unit 312 of the server apparatus 120 determines that the session has already been generated and is maintained, the determining unit 312 notifies the connecting unit 313 of the server apparatus 120 of the determination result.

The connecting unit 313 of the server apparatus 120 connects the supporter terminal 130 to the session having the session ID=AAA, and notifies the managing unit 320 of the server apparatus 120 of the connection event. Accordingly, bidirectional communication between the wearable terminal 110 and the supporter terminal 130 is started.

FIG. 3 (b) is a diagram illustrating details of the processing of the respective units of the server apparatus 120, the wearable terminal 110, and the supporter terminal 130 after the start of bidirectional communication. As illustrated in FIG. 3 (b), after the start of bidirectional communication, the executing unit 310 of the server apparatus 120 receives the moving image data and the audio data from the communication unit 330 of the wearable terminal 110, and transmits the received moving image data and the audio data to the communication unit 340 of the supporter terminal 130. The executing unit 310 of the server apparatus 120 receives the audio data from the communication unit 340 of the supporter terminal 130, and transmits the received audio data to the communication unit 330 of the wearable terminal 110.

Figure 4:
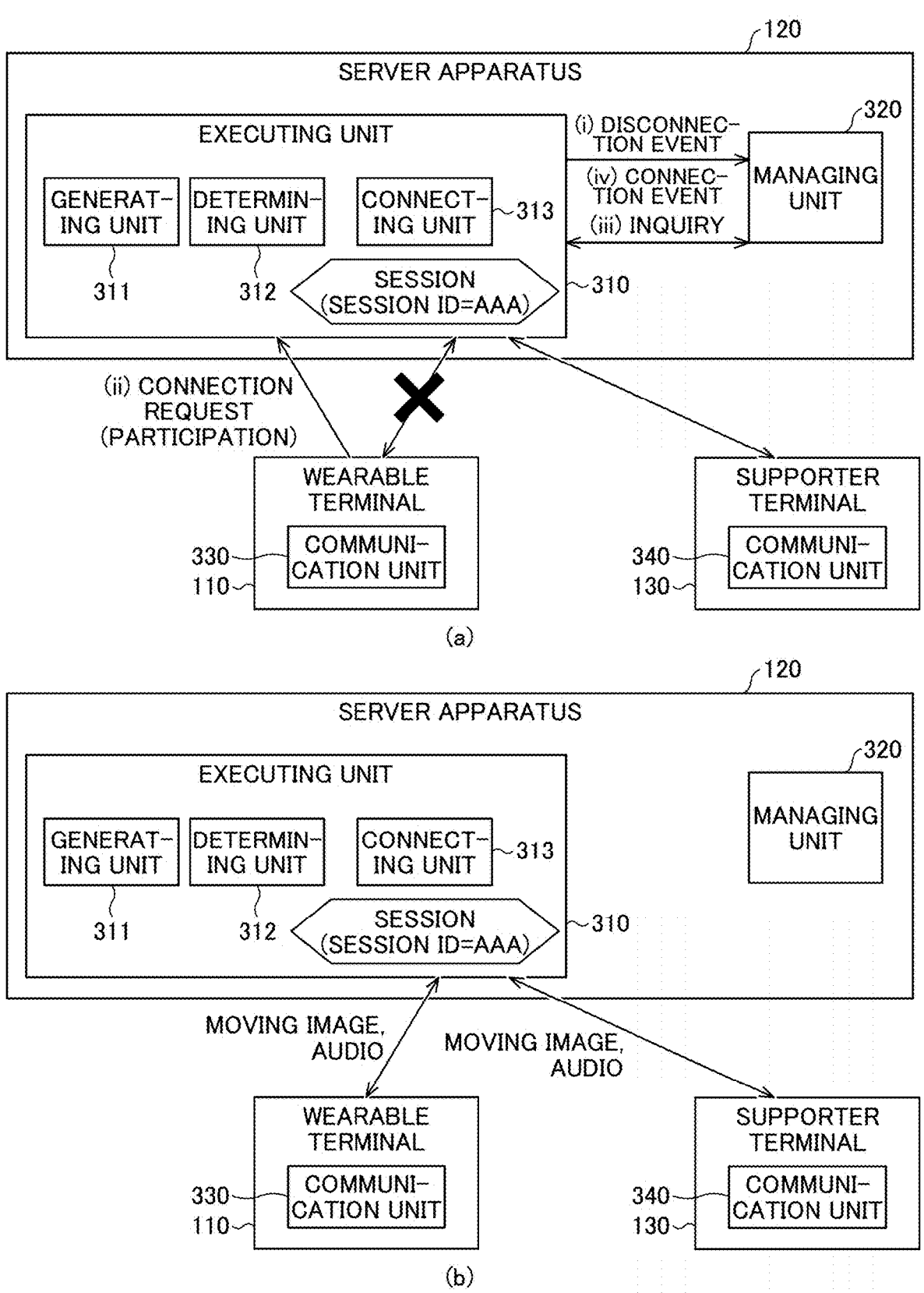
FIG. 4 is a first diagram for explaining details of processing of each unit at the time of bidirectional communication disconnection, reconnection, and after bidirectional communication is resumed.

(2) When the Bidirectional Communication is Disconnected, Reconnected, and after the Bidirectional Communication is Resumed Next, the details of the processing of the respective units of the server apparatus 120, the wearable terminal 110, and the supporter terminal 130 at the time when the bidirectional communication is disconnected, reconnected, and after the bidirectional communication is resumed will be described. FIG. 4 is a first diagram for explaining the details of the processing of the respective units at the time when the bidirectional communication is disconnected, reconnected, and after the bidirectional communication is resumed.

Among the diagrams, FIG. 4 (*a*) is a diagram illustrating details of the processing of each unit of the server apparatus 120, the wearable terminal 110, and the supporter terminal 130 at the time of disconnection and reconnection of the bidirectional communication. When the radio wave of the wearable terminal 110 is interrupted and the bidirectional communication is disconnected, as illustrated in FIG. 4 (*a*), the connecting unit 313 of the server apparatus 120 notifies the managing unit 320 of the server apparatus 120 of a disconnection event indicating that the bidirectional communication by the wearable terminal 110 is disconnected.

On the other hand, when the bidirectional communication is disconnected, the communication unit 330 of the wearable terminal 110 transmits to the server apparatus 120 a request (connection request (participation)) requesting to participate in an existing session having the specified session ID; and
    connect the wearable terminal 110 to the existing session.

Upon receiving the connection request (participation) from the communication unit 330 of the wearable terminal 110, the determining unit 312 of the server apparatus 120 determines whether a session having the specified session ID (for example, session ID=AAA) has already been generated and is maintained. As described above, the determination by the determining unit 312 is made based on the result of an inquiry made to the managing unit 320 that manages the session.

At this point, the supporter terminal 130 is connected to the session having the session ID=AAA, and the session having the session ID=AAA is maintained. Therefore, the determining unit 312 of the server apparatus 120 determines that the session having the specified session ID has already been generated and is maintained, and notifies the connecting unit 313 of the server apparatus 120 of the determination result.

The connecting unit 313 of the server apparatus 120 connects the wearable terminal 110 to the session having the session ID=AAA, and notifies the managing unit 320 of the server apparatus 120 of the connection event. Accordingly, the bidirectional communication between the wearable terminal 110 and the supporter terminal 130 is resumed.

FIG. 4 (*b*) is a diagram illustrating details of the processing of each unit of the server apparatus 120, the wearable terminal 110, and the supporter terminal 130 when the bidirectional communication is resumed. As illustrated in FIG. 4 (*b*), when the bidirectional communication is resumed, the executing unit 310 of the server apparatus 120 receives the moving image data and the audio data from the communication unit 330 of the wearable terminal 110, and transmits the received moving image data and the audio data to the communication unit 340 of the supporter terminal 130. The executing unit 310 of the server apparatus 120 receives audio data from the communication unit 340 of the supporter terminal 130 and transmits the received audio data to the communication unit 330 of the wearable terminal 110.

(3) At the End of Bidirectional Communication and after the End of Bidirectional Communication Next, the details of the processing of the respective units of the server apparatus 120, the wearable terminal 110, and the supporter terminal 130 at the end of bidirectional communication and after the end of bidirectional communication will be described. FIG. 5 is a diagram for explaining the details of the processing of the respective units at the end of bidirectional communication and after the end of bidirectional communication. Among the diagrams, FIG. 5 (*a*) is a diagram illustrating the details of the processing of the respective units of the server apparatus 120, the wearable terminal 110, and the supporter terminal 130 at the end of bidirectional communication. As illustrated in FIG. 5 (*a*), the determining unit 312 of the server apparatus 120 receives a request (disconnection request (exit)) from the communication unit 330 of the wearable terminal 110 and the communication unit 340 of the supporter terminal 130 requesting to exit the session having the specified session ID; and
    disconnect the connection with the session to exit from.

When the determining unit 312 of the server apparatus 120 receives the disconnection request (exit), the connecting unit 313 of the server apparatus 120 disconnects the session having the specified session ID (for example, session ID=AAA) from the wearable terminal 110 and the supporter terminal 130. Accordingly, the number of terminals connected to the session having the session ID=AAA becomes zero, so that the generating unit 311 of the server apparatus 120 deletes the session having the session ID=AAA.

FIG. 5 (*b*) is a diagram illustrating the processing of each unit of the server apparatus 120 after the end of the bidirectional communication. As illustrated in FIG. 5 (*b*), the connecting unit 313 of the server apparatus 120 notifies the managing unit 320 of the server apparatus 120 of a disconnection event indicating that the connection between the session having the specified session ID and the wearable terminal 110 is disconnected. Further, the connecting unit 313 of the server apparatus 120 notifies the managing unit 320 of the server apparatus 120 of a disconnection event indicating that the connection between the session having the specified session ID and the supporter terminal 130 is disconnected. Accordingly, the managing unit 320 of the server apparatus 120 ends the management of the session having the session ID=AAA.

<Flow of Processing in the Management System>

Next, a flow of processing in the management system 100 will be described.

(1) Before Bidirectional Communication

Figure 6:
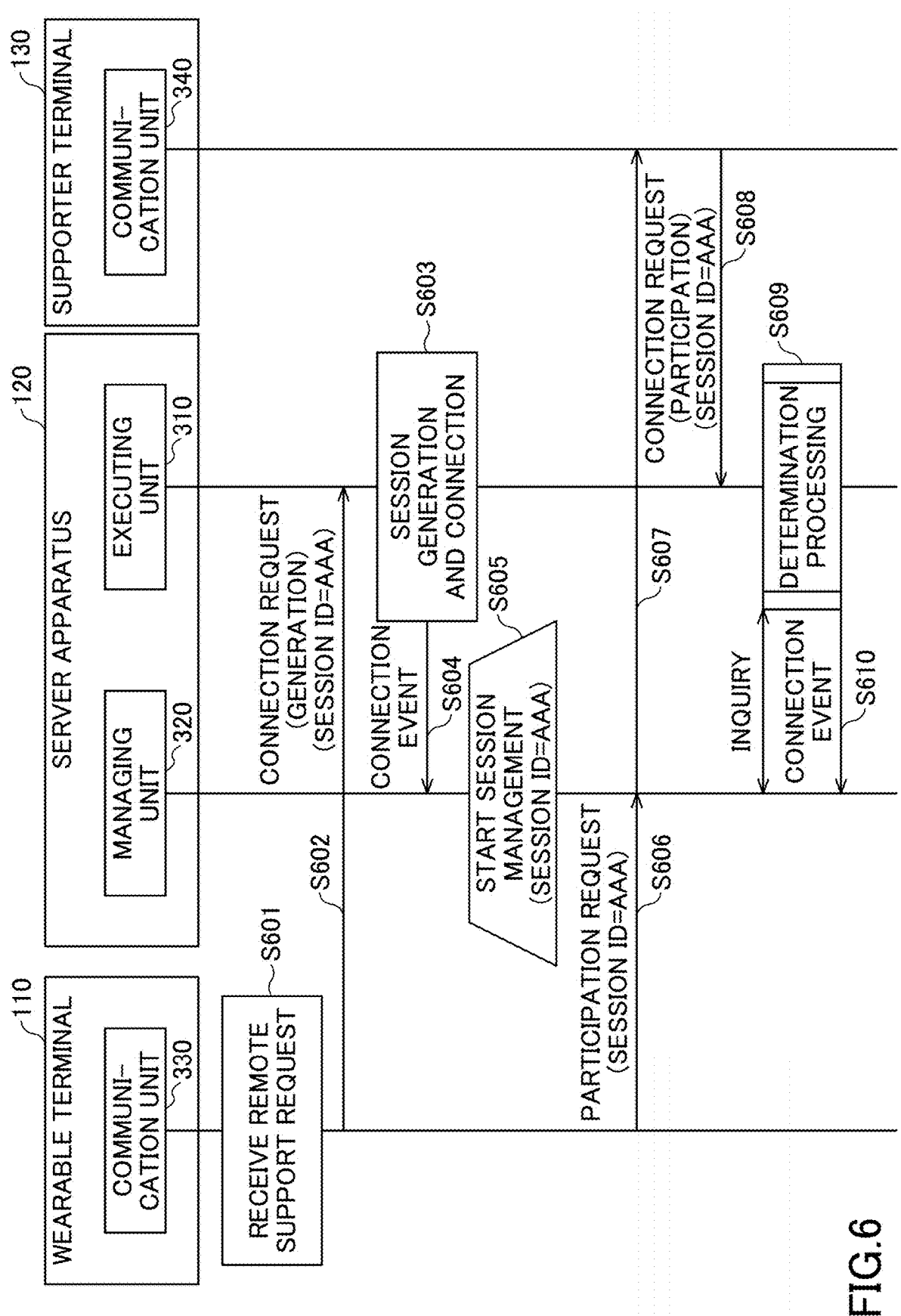
FIG. 6 is a first sequence diagram illustrating the flow of processing in the management system.

First, a flow of processing in the management system 100 before bidirectional communication will be described. FIG. 6 is a first sequence diagram illustrating a flow of processing in the management system. Hereinafter, in explaining the flow of processing in the management system 100, the generating unit 311, the determining unit 312, and the connecting unit 313 will be described as the executing unit 310 without distinguishing these units from each other for the sake of simplifying the explanation.

As illustrated in FIG. 6, in step S601, the communication unit 330 of the wearable terminal 110 receives a remote support request from the site worker 150 (for example, a specification of a session ID and a start operation with a start operation button are received.).

In step S602, the communication unit 330 of the wearable terminal 110 transmits a connection request (generation) specifying a session ID (for example, session ID=AAA) to the executing unit 310 of the server apparatus 120.

In step S603, the executing unit 310 of the server apparatus 120 generates a new session having the specified session ID (for example, session ID=AAA), and connects the wearable terminal 110 to the generated session.

In step S604, the executing unit 310 of the server apparatus 120 notifies the managing unit 320 of the server apparatus 120 of the connection event.

In step S605, the managing unit 320 of the server apparatus 120 starts management of the session having the specified session ID (for example, session ID=AAA).

In step S606, the communication unit 330 of the wearable terminal 110 transmits a participation request including the specified session ID (for example, session ID=AAA) to the managing unit 320 of the server apparatus 120.

In step S607, the managing unit 320 of the server apparatus 120 transmits the participation request received from the communication unit 330 of the wearable terminal 110 to the communication unit 340 of the supporter terminal 130.

In step S608, the communication unit 340 of the supporter terminal 130 transmits a connection request (participation) specifying the session ID (for example, session ID=AAA) included in the participation request received from the managing unit 320 of the server apparatus 120 to the executing unit 310 of the server apparatus 120.

In step S609, the executing unit 310 of the server apparatus 120 performs a determination process. Specifically, the executing unit 310 of the server apparatus 120 determines whether a session having the session ID (for example, session ID=AAA) specified by the connection request (participation) sent from the communication unit 340 of the supporter terminal 130 has already been generated and is maintained. Note that the determination is performed based on the result of an inquiry made to the managing unit 320 managing the session.

When it is determined that the session having the specified session ID has already been generated and is maintained, the executing unit 310 of the server apparatus 120 connects the supporter terminal 130 to the session. This enables bidirectional communication between the wearable terminal 110 and the supporter terminal 130. Details of the determination processing (step S609) by the executing unit 310 of the server apparatus 120 will be described later.

In step S610, the executing unit 310 of the server apparatus 120 notifies the managing unit 320 of the server apparatus 120 of the connection event.

(2) After Bidirectional Communication Starts, when Bidirectional Communication is Disconnected and Reconnected Part 1

Figure 7:
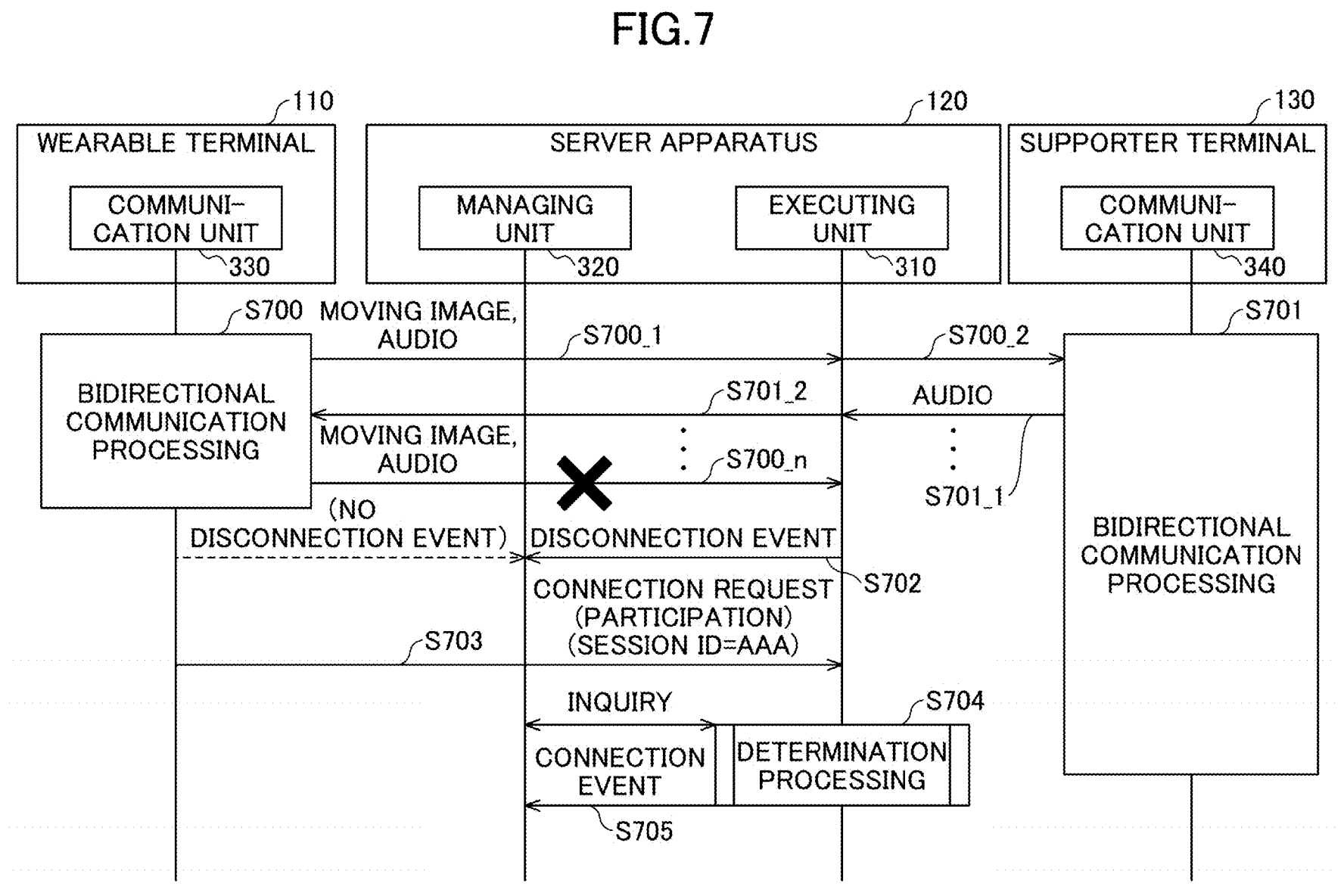

Next, the flow of processing in the management system 100 after bidirectional communication starts, when bidirectional communication is disconnected and reconnected will be described. FIG. 7 is a second sequence diagram illustrating the flow of processing in the management system.

As illustrated in FIG. 7, in step S700, the communication unit 330 of the wearable terminal 110 starts bidirectional communication processing. In step S701, the communication unit 340 of the supporter terminal 130 starts bidirectional communication processing.

Specifically, in step S700_1, the communication unit 330 of the wearable terminal 110 transmits the moving image data obtained by capturing the state of the work site and the audio data obtained by detecting the speech of the site worker 150 to the executing unit 310 of the server apparatus 120.

In step S700_2, the executing unit 310 of the server apparatus 120 transmits the moving image data and the audio data transmitted from the communication unit 330 of the wearable terminal 110 to the communication unit 340 of the supporter terminal 130.

In step S701_1, the communication unit 340 of the supporter terminal 130 transmits the audio data obtained by detecting the speech of the supporter 160 to the executing unit 310 of the server apparatus 120.

In step S701_2, the executing unit 310 of the server apparatus 120 transmits the audio data transmitted from the communication unit 340 of the supporter terminal 130 to the communication unit 330 of the wearable terminal 110. Thereafter, by performing bidirectional communication processing between the wearable terminal 110 and the supporter terminal 130, the following is repeated:

transmission of the moving image data and the audio data by the communication unit 330 of the wearable terminal 110;

reception of the moving image data and the audio data by the communication unit 340 of the supporter terminal 130;

transmission of audio data by the communication unit 340 of the supporter terminal 130; and reception of audio data by the communication unit 330 of the wearable terminal 110.

Here, in step S700_n, when the communication unit 330 of the wearable terminal 110 transmits moving image data and audio data to the executing unit 310 of the server apparatus 120, it is assumed that the radio wave of the wearable terminal 110 is interrupted and the bidirectional communication is disconnected.

In this case, in step S702, the executing unit 310 of the server apparatus 120 determines that the bidirectional communication by the wearable terminal 110 is disconnected, and notifies the managing unit 320 of the server apparatus 120 of the disconnect event.

The managing unit 320 of the server apparatus 120 determines that the disconnect is not a normal disconnect but rather a network disconnect, because the executing unit 310 notifies of the disconnect event, but the wearable terminal 110 does not notify of the disconnect event.

On the other hand, the communication unit 330 of the wearable terminal 110 starts reconnection when the radio wave is interrupted and the bidirectional communication is disconnected. Specifically, in step S703, the communication unit 330 of the wearable terminal 110 transmits a connection request (participation) specifying the session ID=AAA to the executing unit 310 of the server apparatus 120.

In step S704, when the executing unit 310 of the server apparatus 120 receives a connection request (participation) from the communication unit 330 of the wearable terminal 110, the executing unit 310 performs a determination process. Specifically, the executing unit 310 of the server apparatus 120 determines whether a session having the session ID=AAA specified by the connection request (participation) transmitted from the communication unit 330 of the wearable terminal 110 has already been generated and is maintained. The determination is made based on the result of an inquiry made to the managing unit 320 that manages the session.

As illustrated in FIG. 7, at this point, the supporter terminal 130 continues to be connected to the session having the session ID=AAA. Therefore, the executing unit 310 of the server apparatus 120 determines that the session having the session ID=AAA has already been generated and is maintained, and reconnects the wearable terminal 110 to the session having the session ID=AAA. This enables bidirectional communication between the wearable terminal 110 and the supporter terminal 130. Accordingly, for example, when the site worker 150 wants to continue receiving instructions from the supporter 160 even after the bidirectional communication is disconnected, it is possible to smoothly receive instructions.

In step S705, the executing unit 310 of the server apparatus 120 notifies the managing unit 320 of a connection event indicating that the wearable terminal 110 is reconnected to the session having the session ID=AAA.

(3) After Bidirectional Communication Starts, when Bidirectional Communication is Disconnected and Reconnected Part 2

Figure 8:
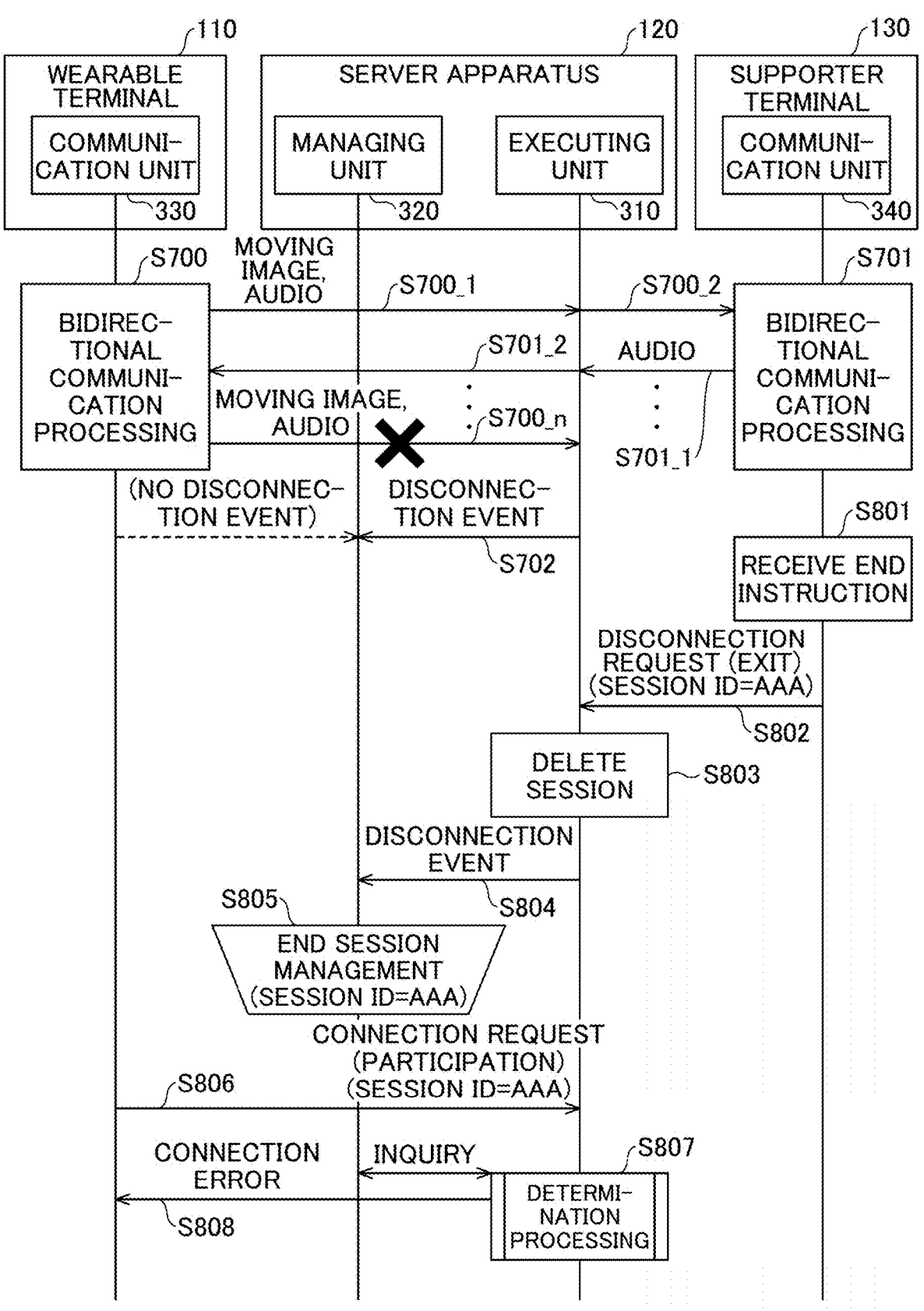
FIG. 8 is a third sequence diagram illustrating the flow of processing in the management system.

Next, the flow of processing in the management system 100 after bidirectional communication starts, when bidirectional communication is disconnected, and when reconnected will be described. FIG. 8 is a third sequence diagram illustrating the flow of processing in the management system. Because the processing from step S700 to step S702 in the sequence diagram illustrated in FIG. 8 is the same as the processing from step S700 to step S702 in the sequence diagram illustrated in FIG. 7, a description thereof will be omitted here. The difference from the sequence diagram illustrated in FIG. 7 is from step S801.

As illustrated in FIG. 8, when the bidirectional communication by the wearable terminal 110 is disconnected, the supporter 160 of the supporter terminal 130 may temporarily exit the session to which the supporter terminal 130 is connected. Therefore, a process when the supporter 160 exits the session will be described in step S801 and subsequent steps.

In step S801, the communication unit 340 of the supporter terminal 130 receives an instruction to end the remote support from the supporter 160. In step S802, the communication unit 340 of the supporter terminal 130 transmits a disconnection request (exit) specifying the session ID (for example, session ID=AAA) to the executing unit 310 of the server apparatus 120.

In step S803, the executing unit 310 of the server apparatus 120 disconnects the session having the specified session ID (for example, session ID=AAA) from the supporter terminal 130. At this point, because the number of terminals connected to the session having the session ID=AAA becomes zero, the executing unit 310 of the server apparatus 120 deletes the session having the session ID=AAA.

In step S804, the executing unit 310 of the server apparatus 120 notifies the managing unit 320 of a disconnection event indicating that the connection between the session having the session ID=AAA and the supporter terminal 130 is disconnected.

In step S805, the managing unit 320 of the server apparatus 120 ends the management of the session having the session ID=AAA upon receiving the disconnection event in steps S702 and S804.

Note that even if the communication unit 330 of the wearable terminal 110 transmits a connection request (participation) specifying the session ID=AAA at this timing, the wearable terminal 110 cannot connect to the session having the session ID=AAA. From step S806, the processing is illustrated in a case where the wearable terminal 110 transmits a connection request (participation) after the management of the session having the session ID=AAA by the managing unit 320 of the server apparatus 120 is ended.

In step S806, the communication unit 330 of the wearable terminal 110 transmits a connection request (participation) specifying the session ID=AAA to the executing unit 310 of the server apparatus 120.

In step S807, the executing unit 310 of the server apparatus 120 performs determination processing. Specifically, the executing unit 310 of the server apparatus 120 determines whether a session having the session ID (for example, session ID=AAA) specified by the connection request (participation) transmitted from the communication unit 340 of the supporter terminal 130 has already been generated and is maintained. Note that the determination is made based on the result of an inquiry made to the managing unit 320 managing the session.

At this time, the executing unit 310 of the server apparatus 120 determines that the session having the session ID=AAA has already been generated but is not maintained. Therefore, in step S808, the executing unit 310 of the server apparatus 120 transmits a connection error to the communication unit 330 of the wearable terminal 110.

In this case, the site worker 150 inputs another session ID to make a remote support request (that is, to return to the sequence diagram of FIG. 6).

(4) At the End of Bidirectional Communication

Figure 9:
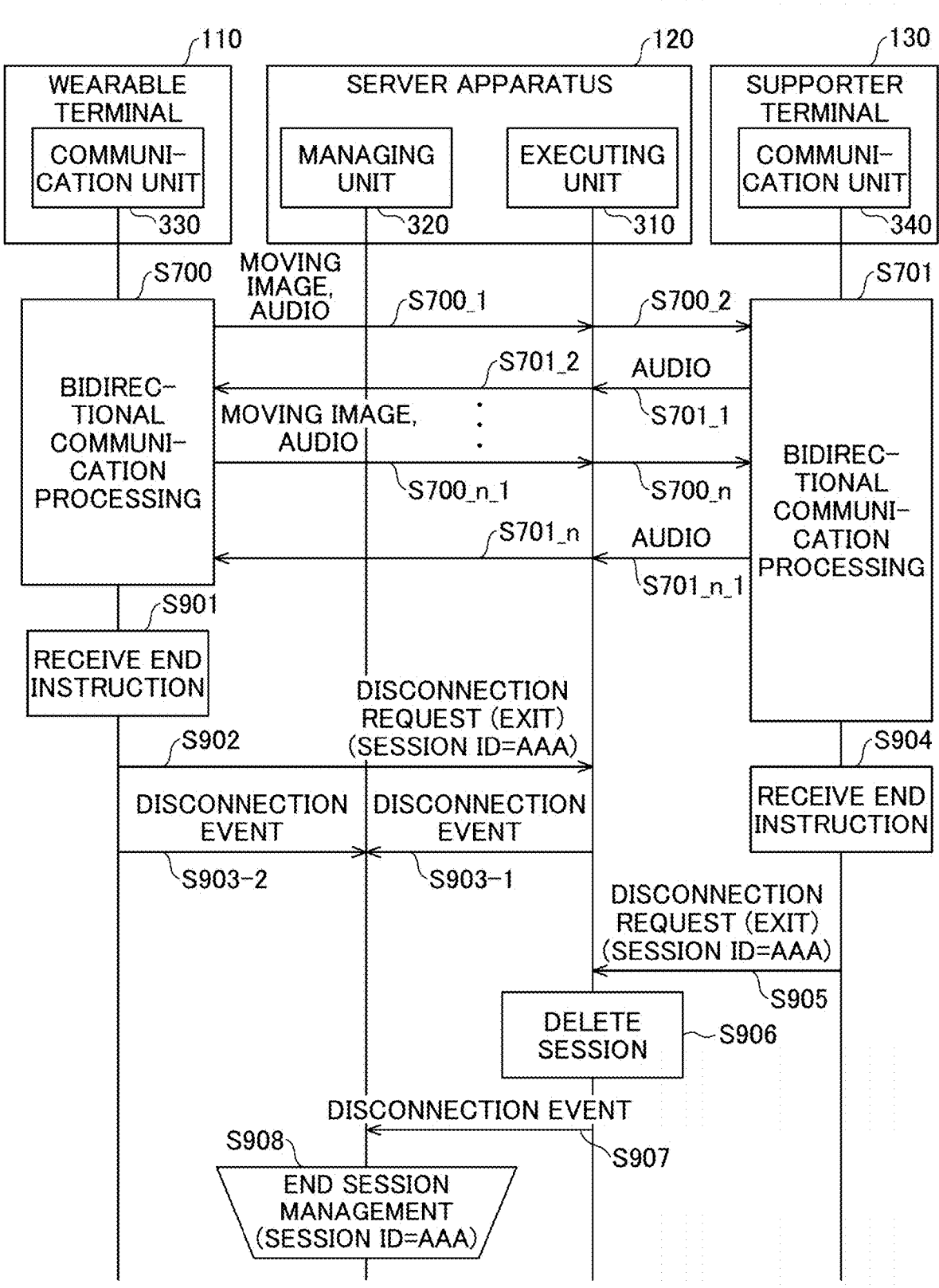
FIG. 9 is a fourth sequence diagram illustrating the flow of processing in the management system.

Next, a flow of processing in the management system 100 at the end of bidirectional communication will be described. FIG. 9 is a fourth sequence diagram illustrating the flow of processing in the management system. In the sequence diagram illustrated in FIG. 9, the processing from step S700 to step S701_*n* is substantially the same as the processing from step S700 to step S700_*n* in the sequence diagram illustrated in FIG. 7, and therefore, a description thereof is omitted here. The difference from the sequence diagram illustrated in FIG. 7 is from step S901. However, in the case of the sequence diagram illustrated in FIG. 9, the bidirectional communication by the wearable terminal 110 continues uninterrupted until completion, without any mid-session disconnections.

As illustrated in FIG. 9, when the bidirectional communication is completed, the site worker 150 of the wearable terminal 110 and the supporter 160 of the supporter terminal 130 perform an operation for exiting the session. Therefore, from step S901, the processing when the site worker 150 and the supporter 160 exit the session will be described.

In step S901, the communication unit 330 of the wearable terminal 110 receives an instruction to end the remote support from the site worker 150. In step S902, the communication unit 330 of the wearable terminal 110 transmits a disconnection request (exit) specifying the session ID (for example, session ID=AAA) to the executing unit 310 of the server apparatus 120.

In step S903_1, the executing unit 310 of the server apparatus 120 disconnects the session having the session ID (for example, session ID=AAA). Further, the executing unit 310 of the server apparatus 120 transmits a disconnection event indicating that the connection with the session having the session ID=AAA is disconnected to the managing unit 320 of the server apparatus 120.

In step S903_2, the communication unit 330 of the wearable terminal 110 directly transmits the disconnection event to the managing unit 320 of the server apparatus 120. Thus, the managing unit 320 of the server apparatus 120 can determine that the disconnection is normal by comparing the disconnection events of steps S930_1 and S930_2. In step S904, the communication unit 340 of the supporter terminal 130 receives an instruction to end the remote support from the supporter 160.

In step S905, the communication unit 340 of the supporter terminal 130 transmits a disconnection request (exit) specifying the session ID (for example, session ID=AAA) to the executing unit 310 of the server apparatus 120.

In step S906, the executing unit 310 of the server apparatus 120 disconnects the session having the specified session ID (for example, session ID=AAA) from the supporter terminal 130. Because the number of terminals connected to the session having the session ID=AAA becomes zero at this point, the executing unit 310 of the server apparatus 120 deletes the session having the session ID=AAA. In step S907, the executing unit 310 of the server apparatus 120 notifies the managing unit 320 of the server apparatus 120 of a disconnection event indicating that the connection between the session having the session ID=AAA and the supporter terminal 130 is disconnected.

In step S908, the managing unit 320 of the server apparatus 120 ends the management of the session having the session ID=AAA.

<Details of Processing of Each Unit>

Among the processes in the management system 100 illustrated in FIGS. 6 to 9, the following will be described in detail:

processing of "session management start" and "session management end" (steps S605, S805, and S908) by the managing unit 320 of the server apparatus 120 (hereinafter collectively referred to as "session management processing"); and
  "determination processing" (steps S609, S704, and S807) by the executing unit 310 of the server apparatus 120.

(1) Session Management Processing

Figure 10:
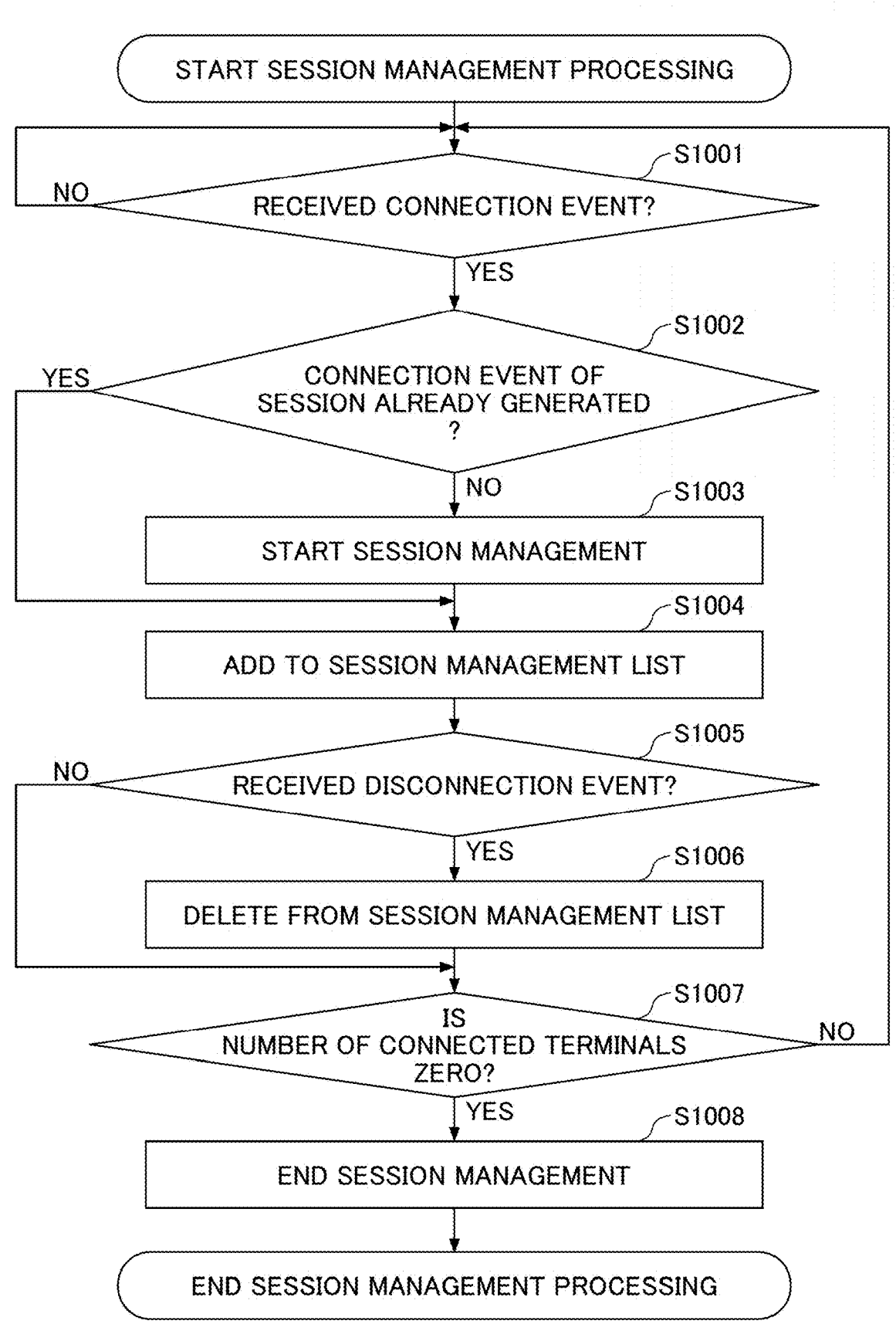
FIG. 10 is a flowchart illustrating the flow of the session management processing.

First, the session management processing by the managing unit 320 of the server apparatus 120 will be described in detail. FIG. 10 is a flowchart illustrating the flow of the session management processing.

In step S1001, the managing unit 320 of the server apparatus 120 determines whether a connection event has been received from the executing unit 310 of the server apparatus 120.

When it is determined in step S1001 that the connection event has not been received (NO in step S1001), the process waits until the connection event is received.

On the other hand, when it is determined in step S1001 that the connection event has been received (YES in step S1001), the process proceeds to step S1002.

In step S1002, the managing unit 320 of the server apparatus 120 determines whether the received connection event is a connection event for a session that has already been generated. When it is determined in step S1002 that the connection event is for a session that has already been generated (YES in step S1002), the process proceeds to step S1004.

On the other hand, when it is determined in step S1002 that the connection event is for a newly generated session (NO in step S1002), the process proceeds to step S1003.

In step S1003, the managing unit 320 of the server apparatus 120 starts management of the newly generated session as a session to be managed.

In step S1004, the managing unit 320 of the server apparatus 120 adds information for identifying the terminal corresponding to the received connection event to the session management list.

In step S1005, the managing unit 320 of the server apparatus 120 determines whether a disconnection event has been received. When it is determined in step S1005 that a disconnection event has been received (YES in step S1005), the process proceeds to step S1006.

In step S1006, the managing unit 320 of the server apparatus 120 deletes information for identifying the terminal corresponding to the received disconnection event from the session management list, and the process proceeds to step S1007.

On the other hand, when it is determined in step S1005 that a disconnection event has not been received (NO in step S1005), the process proceeds directly to step S1007.

In step S1007, the managing unit 320 of the server apparatus 120 determines whether the number of terminals connected to the session to be managed has become zero.

When it is determined in step S1007 that the number of terminals connected to the session to be managed is one or more (NO in step S1007), the process returns to step S1001.

On the other hand, when it is determined in step S1007 that the number of terminals connected to the session to be managed is zero (YES in step S1007), the process proceeds to step S1008.

In step S1008, the managing unit 320 of the server apparatus 120 ends the management of the session being managed.

(2) Determination Processing

Figure 11:
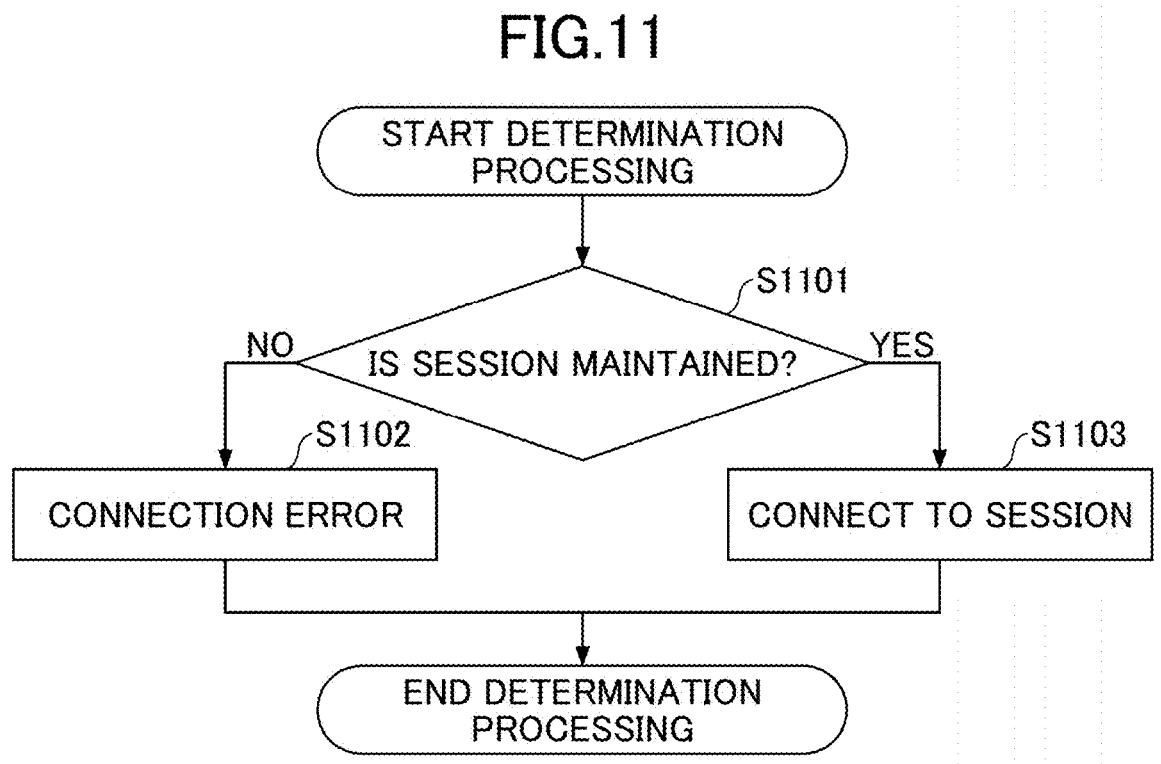
FIG. 11 is a first flowchart illustrating the flow of the determination processing.

Next, the details of the determination processing by the executing unit 310 of the server apparatus 120 will be described. FIG. 11 is a first flowchart illustrating the flow of the determination processing. Upon receiving the connection request (participation) specifying the session ID, the executing unit 310 of the server apparatus 120 starts the determination processing illustrated in FIG. 11.

In step S1101, the executing unit 310 of the having the session ID specified in the received connection request (participation) has already been generated and is maintained. The determination is made based on the result of an inquiry made to the managing unit 320 managing the session.

When it is determined in step S1101 that the session has already been generated but not maintained, or when it is determined that the session has not yet been generated (NO in step S1101), the process proceeds to step S1102.

In step S1102, the executing unit 310 of the server apparatus 120 transmits a connection error to the terminal (the wearable terminal 110 or supporter terminal 130) that has transmitted the connection request (participation).

On the other hand, when it is determined in step S1101 that the session has already been generated and is maintained (YES in step S1101), the process proceeds to step S1103.

In step S1103, the executing unit 310 of the server apparatus 120 connects the terminal (the wearable terminal 110 or the supporter terminal 130) that has transmitted the connection request (participation) to the session having the specified session ID.

SUMMARY

As is clear from the above description, the server apparatus 120 according to the first embodiment is a server apparatus 120 that manages a session when the wearable terminal and the supporter terminal perform bidirectional communication, wherein:

when a connection request (participation) specifying the session ID of the session to which the wearable terminal had been connected is transmitted after the bidirectional communication by the wearable terminal is disconnected, it is determined whether the session having the session ID is maintained; and when the bidirectional communication by the supporter terminal is connected such that the session is maintained, the wearable terminal is reconnected to the session to resume the bidirectional communication with the supporter terminal.

Thus, even if the bidirectional communication by the wearable terminal is disconnected, by maintaining the session if the bidirectional communication by the supporter terminal is connected, the wearable terminal can automatically reconnect to the same session. This eliminates the need for the site worker to perform a new operation for reconnection.

Accordingly, according to the first embodiment, the operation load on the site worker when resuming the bidirectional communication can be reduced.

Second Embodiment

In the first embodiment described above, when the bidirectional communication by the wearable terminal 110 is disconnected, the communication unit 330 of the wearable terminal 110 spontaneously transmits a connection request (participation). However, the communication unit 330 of the wearable terminal 110 may transmit the connection request (participation) based on a reconnection request from the managing unit 320 of the server apparatus 120, for example. Such a configuration is effective when, for example, the supporter 160 wants to continue giving instructions to the site worker 150 even after the bidirectional communication by the wearable terminal 110 is disconnected. Hereinafter, the second embodiment will be described focusing on differences from the first embodiment.

<Processing Flow in the Management System>

Figure 12:
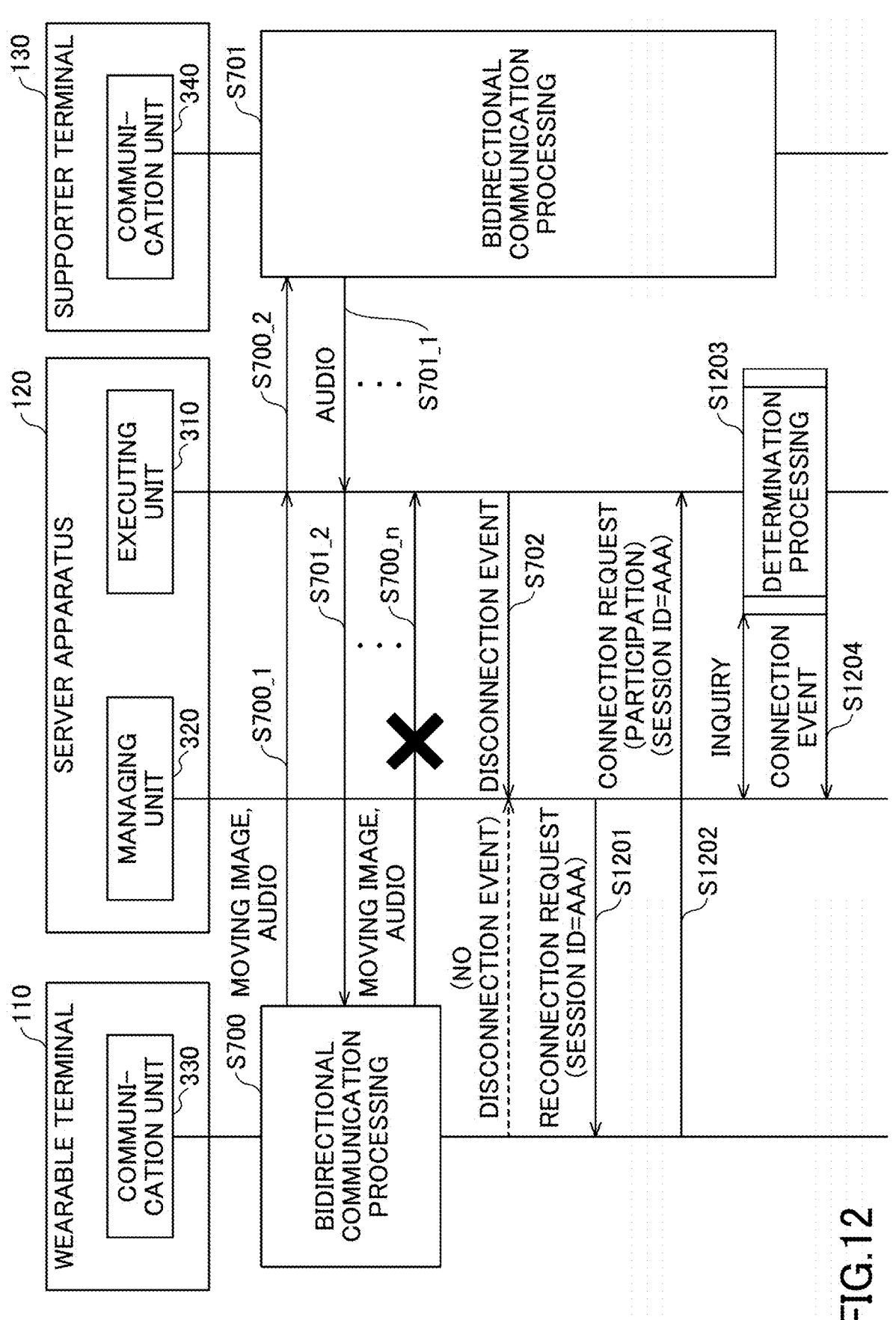
FIG. 12 is a fifth sequence diagram illustrating the flow of processing in the management system.

First, as a flow of processing in the management system 100 according to the second embodiment, a flow of processing in the management system 100 after the start of the bidirectional communication, at the time of disconnection of the bidirectional communication, and at the time of reconnection will be described. FIG. 12 is a fifth sequence diagram illustrating a flow of processing in the management system.

In FIG. 12, the processing from steps S700 to S702 is the same as the processing from steps S700 to S702 described with reference to FIG. 7, and therefore a description thereof will be omitted here.

In step S1201, the managing unit 320 of the server apparatus 120 transmits a reconnection request including the session ID (for example, session ID=AAA) of the connected session to the terminal (here, the wearable terminal 110) corresponding to the disconnection event. The managing unit 320 of the server apparatus 120 transmits a reconnection request when the session is maintained.

In step S1202, the communication unit 330 of the wearable terminal 110 transmits a connection request (participation) specifying the session ID=AAA included in the received reconnection request to the executing unit 310 of the server apparatus 120.

In step S1203, the executing unit 310 of the server apparatus 120 performs determination processing. Specifically, the executing unit 310 of the server apparatus 120 determines whether a session having the session ID=AAA specified by the connection request (participation) sent from the communication unit 330 of the wearable terminal 110 has already been generated and is maintained. The determination is made based on the result of an inquiry made to the managing unit 320 that manages the session.

When the executing unit 310 of the server apparatus 120 determines that the session has already been generated and is maintained, the executing unit 310 determines whether the specified session ID=AAA matches the session ID included in the reconnection request.

When the executing unit 310 of the server apparatus 120 determines that the session matches, the executing unit 310 connects the wearable terminal 110 to the session. Accordingly, the bidirectional communication between the wearable terminal 110 and the supporter terminal 130 is resumed. Details of the determination processing (step S1203) by the executing unit 310 of the server apparatus 120 will be described later.

Then, in step S1204, the executing unit 310 of the server apparatus 120 notifies the managing unit 320 of the server apparatus 120 of the connection event.

<Details of the Determination Processing by the Executing Unit>

Figure 13:
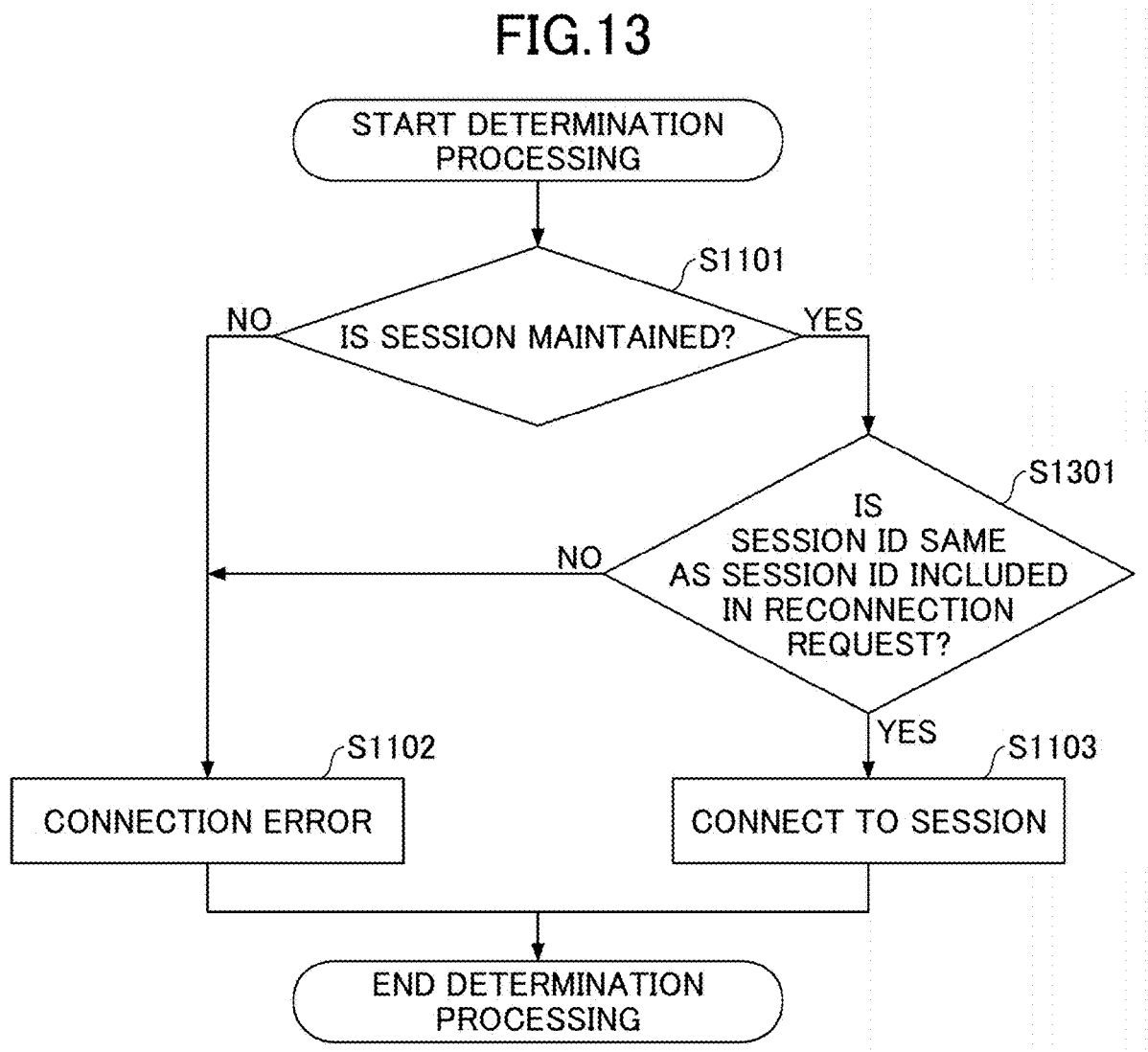
FIG. 13 is a second flowchart illustrating the flow of determination processing.

Next, details of the "determination processing" (step S1203) by the executing unit 310 of the server apparatus 120 will be described. FIG. 13 is a second flowchart illustrating the flow of the determination process. When the executing unit 310 of the server apparatus 120 receives the connection request (participation) specifying the session ID, the executing unit 310 starts the determination process illustrated in FIG. 13. Among the determination processing illustrated in FIG. 13, the processing illustrated in steps S1101 to S1103 are the same as the processing illustrated in steps S1101 to S1103 of the determination processing illustrated in FIG. 11, and a description thereof will be omitted here.

In step S1301, the executing unit 310 of the ID specified in the received connection request (participation) is the same as the session ID included in the reconnection request.

When it is determined in step S1301 that the session IDs are not the same (NO in step S1301), the process proceeds to step S1102. In this case, the executing unit 310 of the server apparatus 120 transmits a connection error to the communication unit 330 of the wearable terminal 110.

On the other hand, when it is determined in step S1301 that the session IDs are the same (YES in step S1301), the process proceeds to step S1103. In this case, the executing unit 310 of the server apparatus 120 connects the wearable terminal 110 to the session having the specified session ID.

In this way, by determining whether the session IDs match as described above, the executing unit 310 of the server apparatus 120 can prevent the wearable terminal 110 from reconnecting to an incorrect session and instead enable the wearable terminal 110 to reconnect to the appropriate session.

SUMMARY

As is clear from the above description, the server apparatus 120 according to the second embodiment is a server apparatus 120 for managing a session when a wearable terminal and a supporter terminal perform bidirectional communication, wherein when the session to which the wearable terminal has been connected is maintained even after the bidirectional communication by the wearable terminal is disconnected, a reconnection request including the session ID of the session is transmitted to the wearable terminal; and when a connection request specifying the same session ID as the session ID included in the reconnection request is transmitted from the wearable terminal in response to the transmission of the reconnection request, the wearable terminal is reconnected to the session having the specified session ID, then, the bidirectional communication with the supporter terminal already connected to the session is resumed.

Thus, according to the second embodiment, it is possible to reduce the operation load of the site worker when resuming the bidirectional communication, and to reconnect to an appropriate session.

Third Embodiment

In the second embodiment described above, the executing unit 310 of the server apparatus 120 determines whether the session ID included in the reconnection request and the session ID specified in the connection request (participation) are the same. However, the wearable terminal may determine whether the session ID included in the reconnection request is the same as the session ID specified in the connection request (participation). Hereinafter, the third embodiment will be described focusing on differences from the second embodiment.

<Functional configuration of server apparatus and wearable terminal>

First, the functional configurations of the server apparatus 120 and a wearable terminal 1410 will be described. In the third embodiment, the wearable terminal 1410 functions as an identifier determining unit 1411 in addition to the communication unit 330. Hereinafter, the details of the processing of each unit of the server apparatus 120, the wearable terminal 1410, and the supporter terminal 130 will be described separately for each phase of the bidirectional communication with reference to FIGS. 14 and 15. The description will focus on differences from FIGS. 3 and 4.

Figure 14:
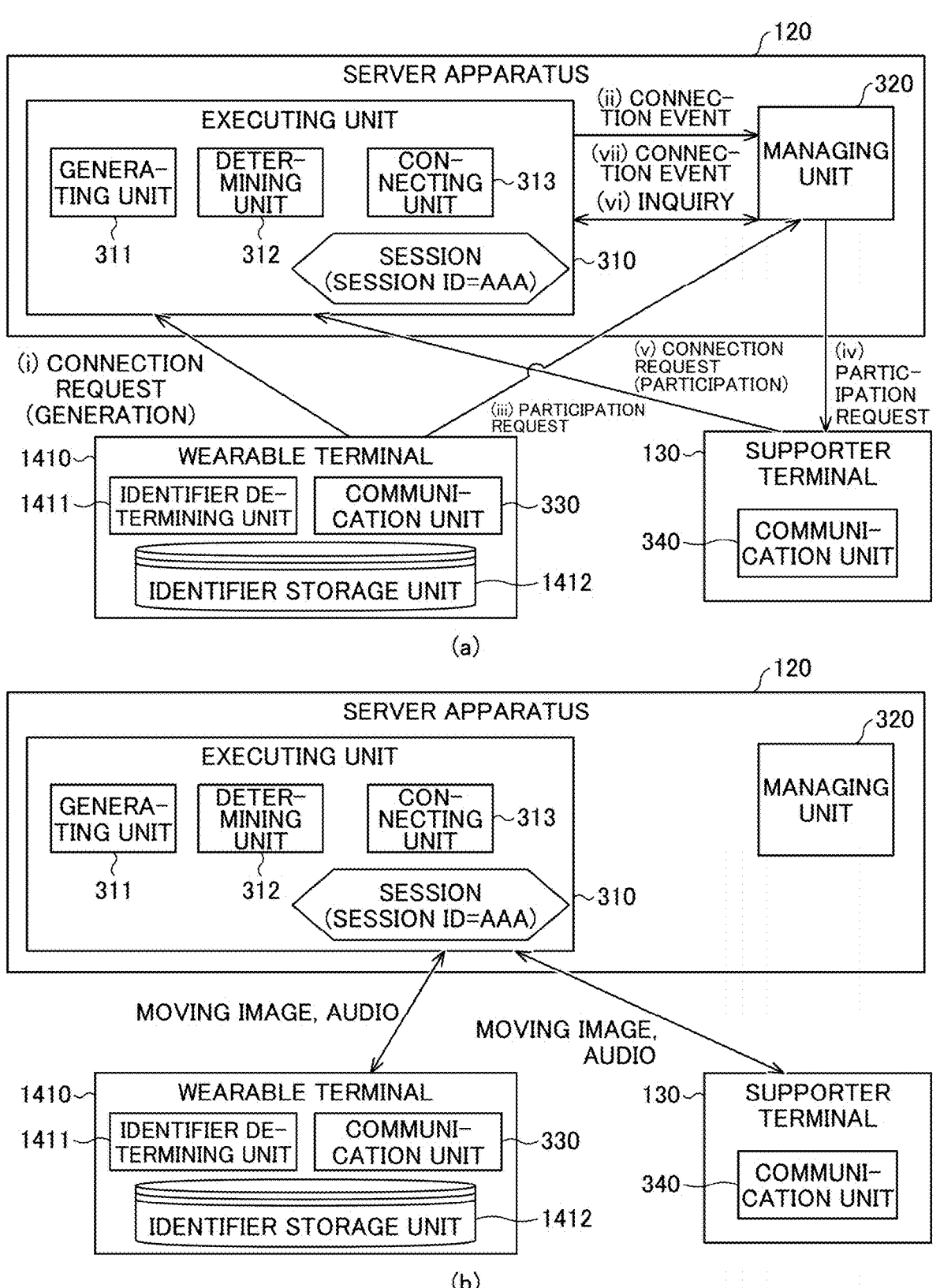
FIG. 14 is a second diagram for explaining the details of processing of each unit before and after the start of bidirectional communication.

(1) Before the Bidirectional Communication and after the Start of the Bidirectional Communication FIG. 14 is a second diagram for explaining the details of the processing of each unit before the bidirectional communication and after the bidirectional communication is started. As illustrated in FIG. 14 (*a*), before the bidirectional communication, the communication unit 330 of the wearable terminal 1410 transmits a connection request (generation) specifying a session ID to the server apparatus 120. At this time, the communication unit 330 stores the session ID specified in the connection request (generation) in an identifier storage unit 1412.

Figure 15:
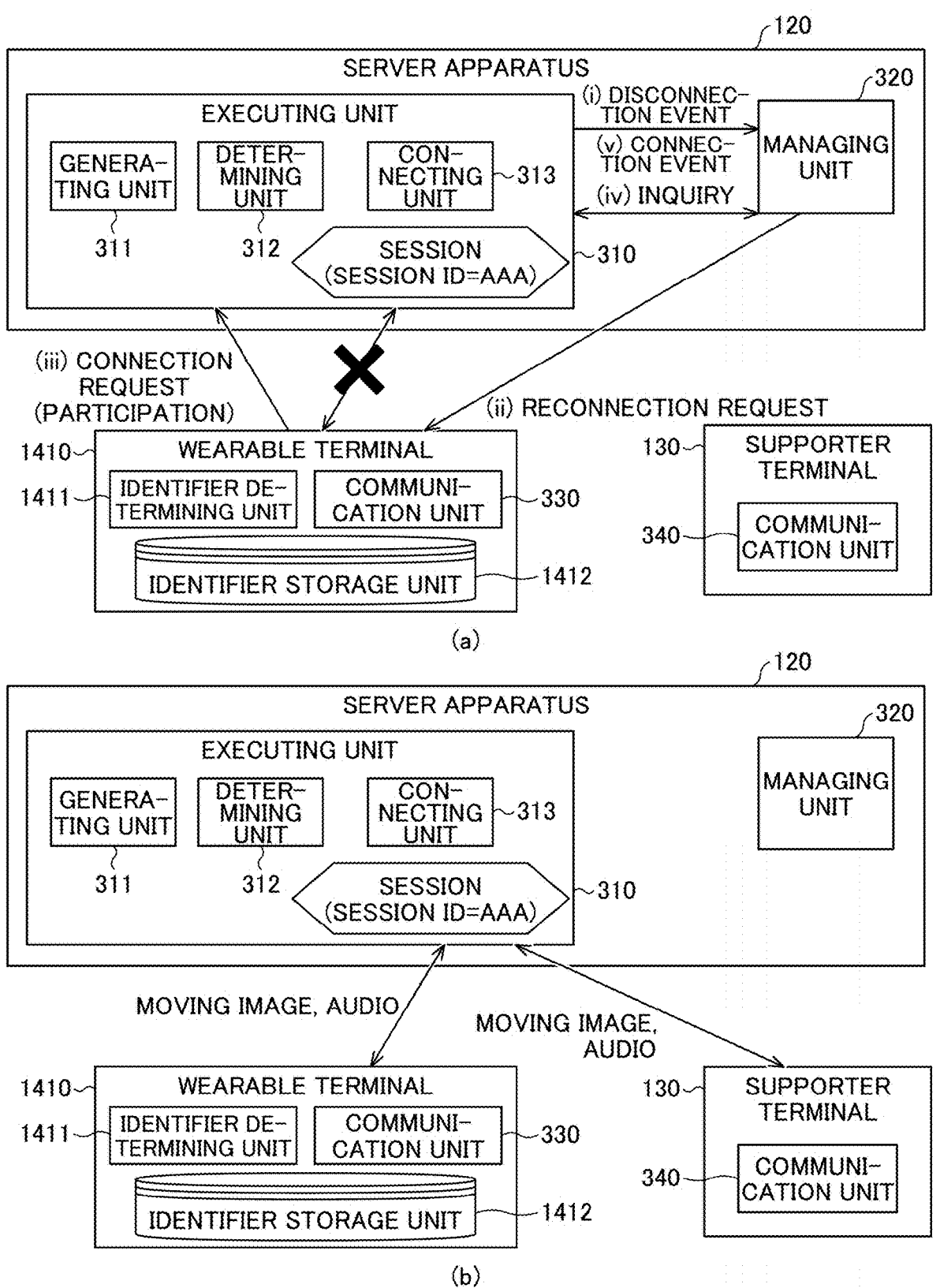
FIG. 15 is a second diagram for explaining the details of processing of each unit when the bidirectional communication is disconnected, reconnected, and after the bidirectional communication is resumed.

(2) When the Bidirectional Communication is Disconnected, Reconnected, and after the Bidirectional Communication is Resumed FIG. 15 is a second diagram for explaining the details of the processing of each unit when the bidirectional communication is disconnected, reconnected, and after the bidirectional communication is resumed. As illustrated in FIG. 15, when the bidirectional communication is disconnected, the managing unit 320 of the server apparatus 120 transmits a reconnection request to the wearable terminal 1410.

The identifier determining unit 1411 of the wearable terminal 1410 acquires the session ID included in the received reconnection request, and determines whether the session ID matches the session ID stored in the identifier storage unit 1412.

Further, when it is determined by the identifier determining unit 1411 that the session IDs match, the communication unit 330 of the wearable terminal 1410 transmits a connection request (participation) specifying the session ID to the server apparatus 120. On the other hand, when it is determined by the identifier determining unit 1411 that the session IDs do not match, the communication unit 330 of the wearable terminal 1410 transmits a connection request (generation) specifying a new session ID to the server apparatus 120. At this time, the communication unit 330 newly stores the session ID specified in the connection request (generation) in the identifier storage unit 1412.

Thus, by determining whether the session ID matches the session ID stored in the identifier storage unit 1412, it is possible to avoid transmission of a connection request (participation) specifying an incorrect session ID and to reconnect to an appropriate session.

<Processing Flow in the Management System>

Figure 16:
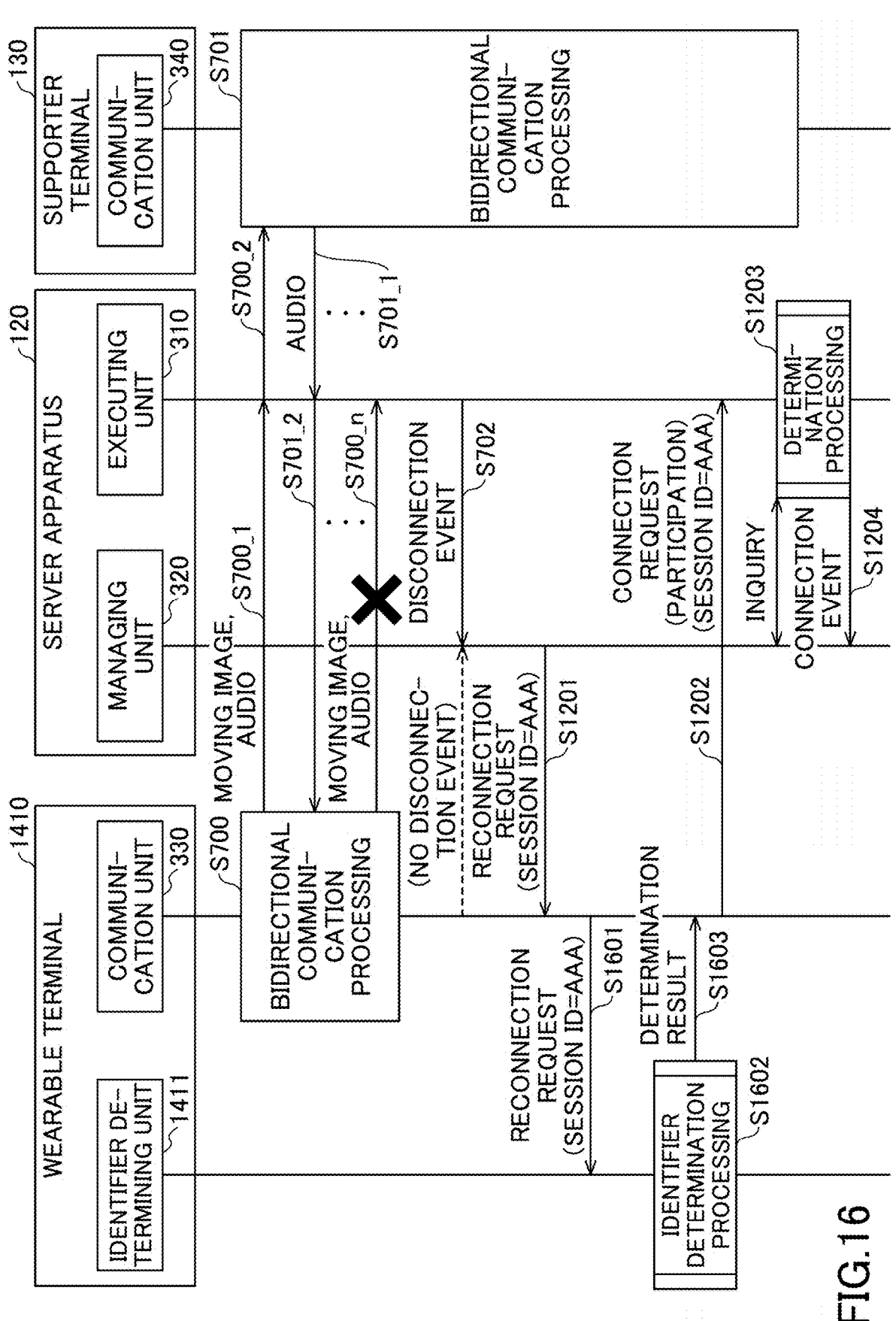
FIG. 16 is a sixth sequence diagram illustrating the flow of processing in the management system.

Next, the processing flow in the management system 100 after the start of the bidirectional communication, when the bidirectional communication is disconnected, and when the connection is reconnected will be described. FIG. 16 is a sixth sequence diagram illustrating the processing flow in the management system.

The difference from the sequence diagram illustrated in FIG. 12 is steps S1601 to S1603. As illustrated in FIG. 16, when the reconnection request is received from the managing unit 320 of the server apparatus 120, the communication unit 330 of the wearable terminal 1410 notifies the identifier determining unit 1411 of the reconnection request in step S1601.

In step S1602, the identifier determining unit 1411 of the wearable terminal 1410 performs identifier determination processing. Specifically, the identifier determining unit 1411 of the wearable terminal 1410 determines whether the session ID (for example, session ID=AAA) included in the reconnection request matches the session ID stored in the identifier storage unit 1412. Details of the identifier determination processing will be described later.

In step S1603, the identifier determining unit 1411 of the wearable terminal 1410 notifies the communication unit 330 of the determination result.

Thus, the communication unit 330 of the wearable terminal 1410 issues a connection request in accordance with the determination result. For example, if the session ID included in the reconnection request matches the session ID stored in the identifier storage unit 1412, a connection request (participation) specifying the session ID is transmitted to the executing unit 310 of the server apparatus 120 (see step S1202 in FIG. 16).

On the other hand, if the session ID included in the reconnection request does not match the session ID stored in the identifier storage unit 1412, a connection request (generation) specifying a new session ID is transmitted to the executing unit 310 of the server apparatus 120 (not illustrated).

<Details of the Identifier Determination Processing by the Identifier Determining Unit>

Figure 17:
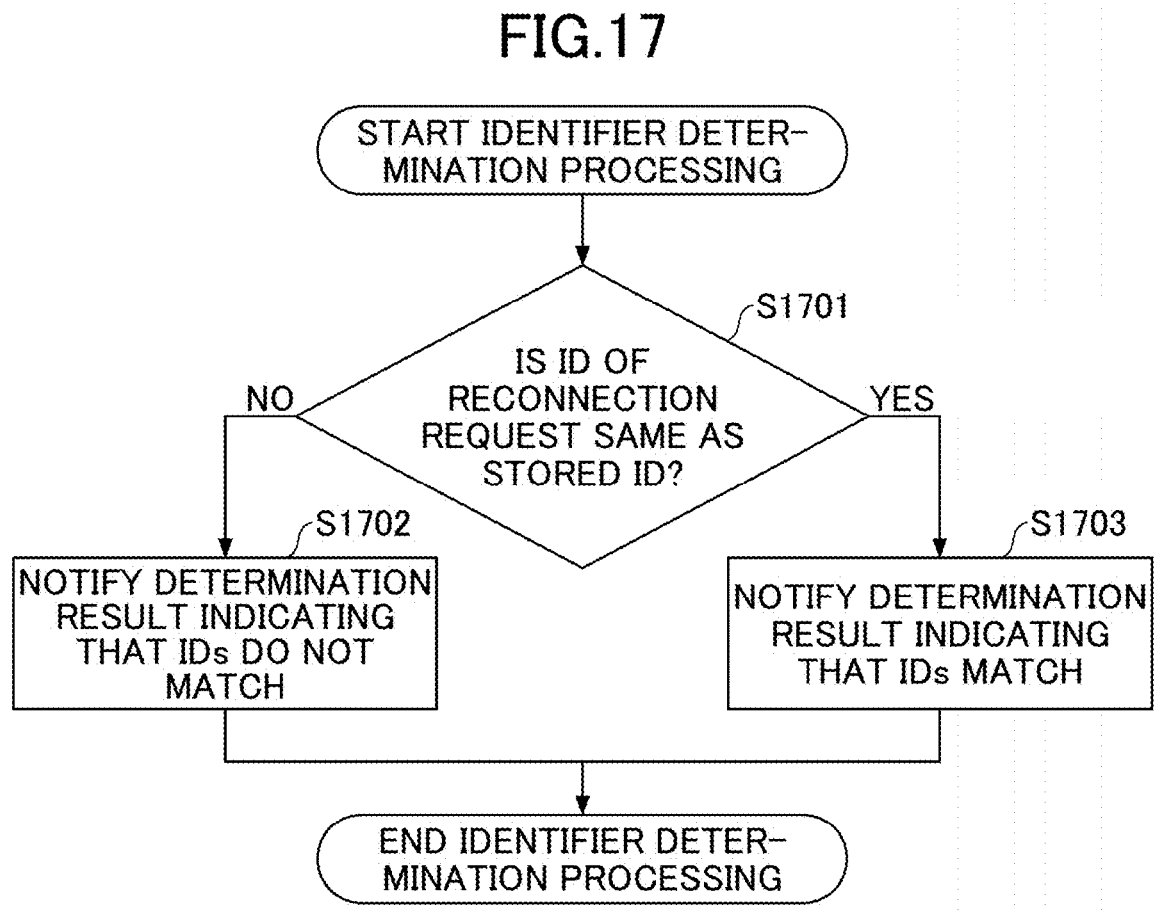
FIG. 17 is a flowchart illustrating the flow of identifier determination processing.

Next, details of the "identifier determination processing" (step S1602) performed by the wearable terminal 1410 will be described. FIG. 17 is a flowchart illustrating the flow of the identifier determination processing. Upon receiving the reconnection request from the communication unit 330, the identifier determining unit 1411 of the wearable terminal 1410 starts the identifier determination process illustrated in FIG. 17.

In step S1701, the identifier determining unit 1411 of the wearable terminal 1410 determines whether the session ID included in the reconnection request matches the session ID stored in the identifier storage unit 1412.

When it is determined in step S1701 that the session IDs do not match (NO in step S1701), the process proceeds to step S1702.

In step S1702, the identifier determining unit 1411 of the wearable terminal 1410 notifies the communication unit 330 of a determination result indicating that the session IDs do not match.

On the other hand, when it is determined in step S1701 that the session IDs match (YES in step S1701), the process proceeds to step S1703.

In step S1703, the identifier determining unit 1411 of the wearable terminal 1410 notifies the communication unit 330 of a determination result indicating that the session IDs match.

SUMMARY

As is clear from the above description, in the management system 100 according to the third embodiment, the wearable terminal stores the session ID specified when starting the bidirectional communication; and the wearable terminal determines whether the stored session ID matches the session ID included in the reconnection request, and if the wearable terminal determines that the session ID matches, the wearable terminal transmits a connection request (participation) specifying the session ID included in the reconnection request to the server apparatus.

Thus, according to the third embodiment, it is possible to reduce the operation load on the site worker when resuming the bidirectional communication, and to reconnect to the appropriate session.

Fourth Embodiment

In the first to third embodiments described above, the management system 100 has one wearable terminal and one supporter terminal. However, the management system 100 may have a plurality of wearable terminals and a plurality of supporter terminals.

In this case, when a plurality of sessions are generated by connection requests (generation) from a plurality of wearable terminals, each of the plurality of supporter terminals can select a session to be connected to. The plurality of sessions may be, for example, two sessions including the first session and the second session, or three or more sessions. Each of the plurality of supporter terminals transmits a connection request (participation) specifying the session ID of the selected session to the executing unit 310 of the server apparatus 120.

Thus, each of the plurality of supporter terminals can connect to an appropriate session even when a plurality of participation requests are received at the same timing.

Similarly, each of the plurality of supporter terminals can select a session to be reconnected to when the bidirectional communication is disconnected. Each of the plurality of supporter terminals transmits a connection request (participation) specifying the session ID of the selected session to the executing unit 310 of the server apparatus 120.

Accordingly, each of the plurality of supporter terminals can reconnect to, for example, the session to which the supporter terminal had been connected immediately before.

Although the embodiments have been described above, it will be understood that various changes in form and details are possible without departing from the spirit and scope of the claims.

The present international application is based upon and claims priority to Japanese patent application no. 2022-042156 filed on Mar. 17, 2022, the entire contents of which are incorporated herein by reference.

REFERENCE SIGNS LIST

100: management system
110: wearable terminal
120: server apparatus
130: supporter terminal
310: executing unit
311: generating unit
312: determining unit
313: connecting unit
320: managing unit
330: communication unit
1410: wearable terminal
1411: identifier determining unit

The invention claimed is:

1. A server apparatus configured to manage a session when bidirectional communication is performed by a first terminal and a second terminal, the server apparatus comprising:

a control unit configured to determine whether the session having an identifier specified in a connection request is maintained based on whether one or more terminals are connected to the session, in response to an event in which the connection request specifying the identifier specified in the connection request to which the first terminal had been connected is transmitted from the first terminal after the bidirectional communication by the first terminal is disconnected, newly generate a session having the identifier specified in the connection request upon determining that the session is not maintained, and connect the first terminal to the newly generated session and connect the second terminal to the newly generated session according to a connection request from the second terminal, to resume the bidirectional communication by the first terminal and the second terminal.

2. The server apparatus according to claim 1, wherein the control unit reconnects the first terminal to the session having the identifier specified in the connection request upon determining that the session is maintained, to resume the bidirectional communication with the second terminal already connected to the corresponding session.

3. The server apparatus according to claim 1, wherein the control unit deletes a session for which a number of connected terminals has become zero, and maintains a session for which a number of connected terminals is one or more.

4. A server apparatus configured to manage a session when bidirectional communication is performed by a first terminal and a second terminal, the server apparatus comprising:

a control unit configured to transmit, to the first terminal, a reconnection request including an identifier of the session to which the first terminal had been connected, upon determining that the session to which the first terminal had been connected is maintained even after the bidirectional communication by the first terminal is disconnected, wherein whether the session having an identifier specified in a connection request is maintained is determined based on whether one or more terminals are connected to the session, and reconnect the first terminal to the session having the identifier specified in the connection request in response to an event in which the connection request specifying the same identifier as the identifier included in the reconnection request is transmitted from the first terminal in response to transmitting the reconnection request, to resume the bidirectional communication with the second terminal already connected to the corresponding session.

5. The server apparatus according to claim 4, wherein the first terminal is configured to transmit s video data or an audio data.

6. A non-transitory computer-readable storage medium that stores therein a program for causing a server apparatus configured to manage a session when bidirectional communication is performed by a first terminal and a second terminal, to execute a process of determining whether the session having an identifier specified in a connection request is maintained based on whether one or more terminals are connected to the session, in response to an event in which the connection request specifying the identifier specified in the connection request to which the first terminal had been connected is transmitted from the first terminal after the bidirectional communication by the first terminal is disconnected, newly generating a session having the identifier specified in the connection request upon determining that the session is not maintained, and connecting the first terminal to the newly generated session and connecting the second terminal to the newly generated session according to a connection request from the second terminal, to resume the bidirectional communication by the first terminal and the second terminal.

7. A management system comprising:
a first terminal;
a second terminal; and
a server apparatus configured to manage a plurality of sessions when bidirectional communication is performed by the first terminal and the second terminal, wherein the first terminal includes a control unit configured to store a specified identifier of a first session of the plurality of sessions upon starting the bidirectional communication with the second terminal;

the server apparatus includes a control unit configured to determine, upon the bidirectional communication by the first terminal being disconnected, whether the first session and a second session different from the first session are each maintained based on whether one or more terminals are connected to the first session and the second session, the second terminal includes a control unit configured to select either one of the first session or the second session upon determining that the first session and the second session are maintained, and transmit, to the server apparatus, a second connection request specifying an identifier of the selected session, the control unit of the first terminal is further configured to transmit, to the server apparatus, a first connection request specifying the stored specified identifier, and the control unit of the server apparatus is further configured to:

in response to receiving the first connection request from the first terminal and the second connection request from the second terminal, resume the bidirectional communication between the first terminal and the second terminal.

8. A management system comprising:
a first terminal;
a second terminal; and
a server apparatus configured to manage a session when bidirectional communication is performed by the first terminal and the second terminal, wherein the server apparatus includes a control unit configured to determine, whether the session is maintained based on whether one or more terminals are connected to the session;

transmit, to the first terminal, a reconnection request including the identifier of the session to which the first terminal had been connected, upon determining that the session to which the first terminal had been connected is maintained even after the bidirectional communication by the first terminal is disconnected, and the first terminal includes a control unit configured to store the specified identifier of the session upon starting the bidirectional communication with the second terminal, determine whether the stored identifier is the same as the identifier included in the reconnection request, and transmit, to the server apparatus, a connection request specifying the stored identifier upon determining that the stored identifier is the same as the identifier included in the reconnection request.

9. The management system according to claim 8, wherein the first terminal is configured to transmit video data or audio data.

10. The management system according to claim 8, wherein the second terminal is configured to output a video data or an audio data.

11. A non-transitory computer-readable storage medium that stores therein a program for causing a server apparatus configured to manage a session when bidirectional communication is performed by a first terminal and a second terminal, to execute a process of transmitting, to the first terminal, a reconnection request including an identifier of the session to which the first terminal had been connected, upon determining that the session to which the first terminal had been connected is maintained even after the bidirectional communication by the first terminal is disconnected, wherein whether the session to which the first terminal had been connected is maintained is determined based on whether one or more terminals are connected to the session, and reconnecting the first terminal to the session having the identifier specified in a connection request in response to an event in which the connection request specifying the same identifier as the identifier included in the reconnection request is transmitted from the first terminal in response to transmitting the reconnection request, to resume the bidirectional communication with the second terminal already connected to the corresponding session.

\* \* \* \* \*